United States Patent [19]

van den Hanenberg et al.

[11] 4,204,253
[45] May 20, 1980

[54] DEVICE FOR GENERATING AND CORRECTING A USER PROGRAM

[75] Inventors: Joannes G. van den Hanenberg; Frederikus J. de Munnik, both of Eindhoven, Netherlands

[73] Assignee: U.S. Philips Corporation, New York, N.Y.

[21] Appl. No.: 888,506

[22] Filed: Mar. 20, 1978

[30] Foreign Application Priority Data

Mar. 22, 1977 [NL] Netherlands ............... 77 03078

[51] Int. Cl.² .................. G06F 15/16; G06F 9/19
[52] U.S. Cl. ......................... 364/200; 364/101; 364/120
[58] Field of Search ... 364/200 MS File, 900 MS File, 364/120, 107, 101, 102

[56] References Cited

U.S. PATENT DOCUMENTS

| 3,668,653 | 6/1972 | Fair et al. .................. 364/200 |
| 3,744,031 | 7/1973 | Avery et al. ............... 364/200 |
| 3,778,775 | 12/1973 | Haring et al. ............. 364/900 |
| 3,816,723 | 6/1974 | Slawson .................... 364/200 |
| 3,938,104 | 2/1976 | Henry et al. .............. 364/900 |
| 3,987,420 | 10/1976 | Badagnani ................ 364/200 |
| 4,012,725 | 3/1977 | Spangler et al. .......... 364/200 |
| 4,038,640 | 7/1977 | Lee et al. .................. 364/200 |
| 4,058,711 | 11/1977 | Ondercin et al. ......... 364/101 |
| 4,070,702 | 1/1978 | Grants et al. .............. 364/900 |
| 4,118,771 | 10/1978 | Pomella et al. ........... 364/101 |

*Primary Examiner*—Mark E. Nusbaum
*Attorney, Agent, or Firm*—Thomas A. Briody; Jack Oisher; James J. Cannon, Jr.

[57] ABSTRACT

The invention relates to a programming panel which preferably comprises a micro-processor and whereby an operator can generate or modify the contents of steps of a user program by means of a number of selection means and value input means, inter alia on the basis of indications displayed on display means for this purpose. The user program is at the disposal of a machine control system, it preferably being possible to couple the programming panel to the system by way of a bus connection. The programming panel comprises standard selection means, notably for so-termed movement primitives.

5 Claims, 12 Drawing Figures

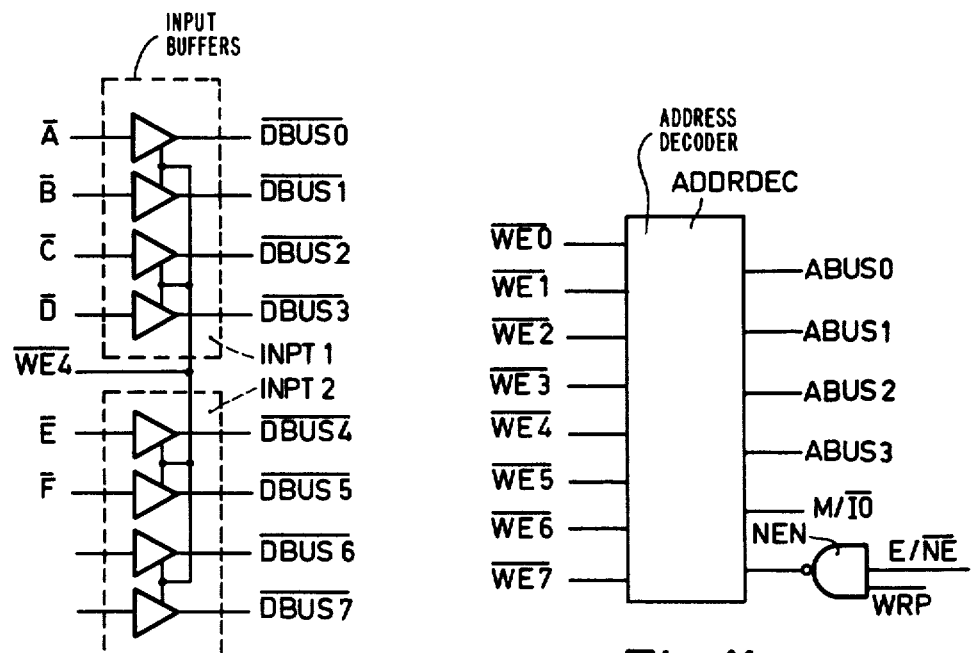
Fig. 10
Fig. 11
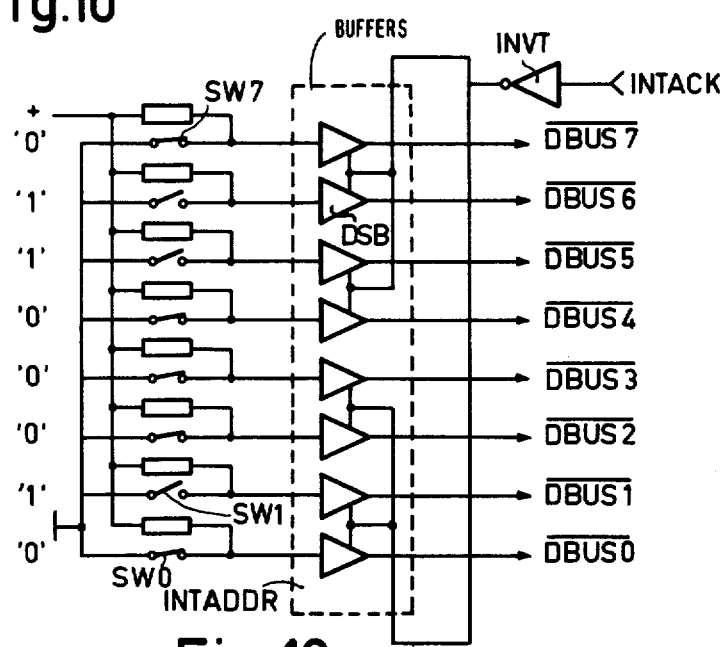
Fig. 12

DEVICE FOR GENERATING AND CORRECTING A USER PROGRAM

BACKGROUND OF THE INVENTION

1. Field of the Invention

The invention relates to a device for generating and correcting a user program which is at the disposal of a machine control system and which is composed of a series of program steps which contain a function code and a space for a parameter value associated with at least one parameter of this function, the device comprising display means, function selection means, parameter selection means, and parameter value selection means. In order to provide insight into the field of the invention, an adapted introductory description will first be given hereinafter.

2. Description of the Prior Art

When it is assumed that a machine is a deterministic automatic device, a simple control panel in the form of a start button, a stop button and an emergency button would suffice as far as the man-machine interface is concerned. However, in practice machines are never fully deterministic, which is due on the one hand to the fact that the task of a machine can be modified to a limited extent by the operator, while on the other hand even the most reliable machine may incur defects. As a result, there is a need for a more extensive control panel which not only comprises the elementary buttons, but also a number of machine-specific buttons and which is also capable of providing the operator with error messages.

In most cases, the operator is not the sole user of the control panel. The panel should also be available for personnel performing adjustment and maintenance of the machine. This illustrates that the need exists for a panel which comprises a variety of buttons and which, moreover, can provide clear messages.

In view of the increasing demand for flexible production machines, these machines actually become substantially non-deterministic automatic devices. Consequently, the man-machine interface must be provided within an extra dimension. This is because in the case of flexible automation, the machine is rendered suitable for a new task by programming the desired behavior on site. This function should also be performed by the control panel. Therefore, the panel is usually referred to as a programming panel in this case.

In principle, the buttons and display means of such a panel could be connected directly to a computer, notably a mini-computer which nowadays in most cases forms part of said machine control system and which also controls the machine, and all software could be accommodated therein. Apart from the fact that this solution necessitates the use of an expensive interface, a substantial amount of communication is then required between programming panel and mini-computer.

If decentralization of the intelligence, i.e. data processing activity, were possible in such surroundings, the communication would be substantially reduced, so that the computer would be relieved and, moreover, the entire control would be clearer.

A further important aspect of the field of machine control systems consists in that the application possibilities of machine control systems may have an elaborate and complex structure. For each field of application of such a system, there will already be substantial numbers of functions which may be of importance. User programs then constitute long series of steps which relate to a wide variety of different functions and which contain the relevant values for the parameters thereof.

SUMMARY OF THE INVENTION

The invention has for its object to reduce the communication between the device, referred to as programming panel, and the machine control system, and to ensure, moreover, that the programming panel is of a univeral nature, i.e. not bound to a given field of application.

In order to achieve this object, the device in accordance with the invention, also referred to hereinafter as the programming panel, is characterized in that the device comprises a processor having storage means which serve for the storage of a table which contains the function codes and the associated parameter codes for the functions available for at least one step of the user program. The storage means of the processor of an arbitrary field of application is determined by the nature and the use of a machine control system. Means are provided to read said codes on the display means, under the control of the processor means, at least as function indications, function selection means thus being designated. It is further being provided to read on the display means, under the control of the processor means and on the basis of the function of a program step, not only the associated function indication, but also the parameter indications, the parameter selection means thus also being designated furthermore. It is also provided to input at least one parameter value, by the parameter value input means, on the basis of said selection of the function with parameter selection means, under the control of the processor means, and to apply said parameter value to the storage means in which a step of the user program is created or modified on the basis of said selections.

Said processor in the programming panel enables independent operation of the programming panel. Communication with the machine control system is required only on the one hand for fetching the table to enable the panel to designate the control and other means present thereon, and on the other hand for transferring already made program steps to the machine control system (one after the other or in groups).

For practical reasons and in order to simplify the set-up of the device in accordance with the invention, a number of function selections means preferably have a fixed designation and relate to standard functions occurring in field of application. This is also applicable to the parameter selection means associated with the said function selection means having a fixed designation.

In a device in accordance with the invention, the function and parameter selection means for the movement primitives are preferably the function and parameters selection means of fixed designation.

Said decentralization of the intelligence in a machine control system can notably be achieved in that the processor of the device in accordance with the invention is formed by a programmed arithmetic device which is connected, by an input/output unit, to a machine control system by way of a bus line. In many cases it will be advantageous for the programmed arithmetic device to be a micro-processor. Thus, an inexpensive but flexible form of the device in accordance with the invention is feasible. As a result of the general set-up of the device in accordance with the invention, the use of this device need not be limited to a given machine control system. Therefore, the device in accordance with the invention is preferably detachable from the bus line in a machine control system, so that it can be utilized in other machine control systems.

A further aspect of the invention, where direct interaction takes place between the machine control system and the operator of the device in accordance with the invention, consists in that there are provided parameter value input means whereby the value of a parameter associated with a function can be step-wise or continuously varied, it being possible to apply, under the control of the processor, the changed parameter value directly for execution to the machine to be controlled. As a result of this method of inputting parameter values, the operator can "teach the machine by doing the action" as if it were. After that, it has been placed in the program and the action is automatically performed.

The invention will be described in detail hereinafter with reference to the Figures. It is to be noted that the embodiments of the programming panel are given only by way of example and that they do not form a restriction as regards the scope of the invention.

BRIEF DESCRIPTION OF THE DRAWINGS

FIGS. 8-12 show details of the block diagram shown in FIG. 7.

DESCRIPTION OF THE PREFERRED EMBODIMENT

Figure 1:
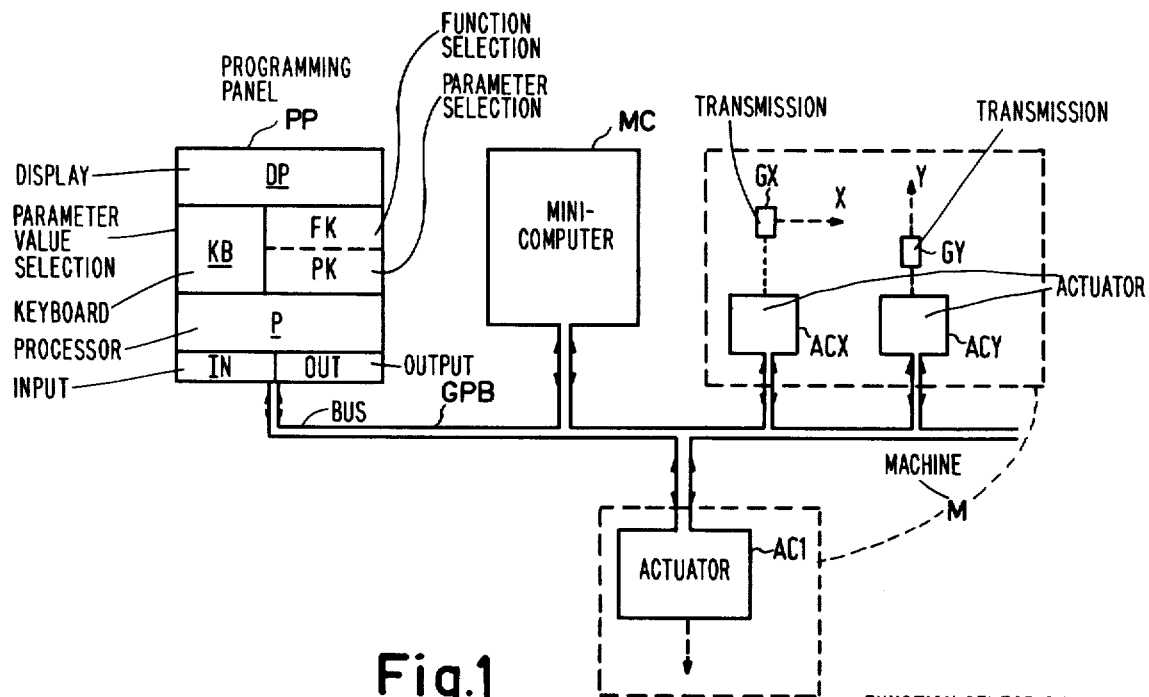
FIG. 1 diagrammatically shows the construction of a machine control system comprising a programming panel in accordance with the invention.

FIG. 1 shows a machine control system in which use can be made of a programming panel. In this embodiment, a programming panel PP in accordance with the invention is included. This panel comprises the parts: DP, the display means; FK, the function selection means; PK, the parameter selection means; P, the processor; KB, the keyboard; IN, the input unit; and OUT, the output unit. The programming panel is connected to a mini-computer MC by a bus GPB. In practice, this may be, for example, the Philips computer P851, its "general purpose bus" GPB being used for connection of the peripheral equipment, etc. the P851 computer is disclosed in several publications; the following two are considered pertinent to this application: P851 CPU AND MEMORY SERVICE MANUAL, VOL. I, NO. 512299128070, published by Philips Data Systems, B.V., Apeldorn, The Netherlands. This publication describes the hardware and the input output bus for the P851 computer; P800M PROGRAMMER'S GUIDE, VOL. II, NO. 512299127380, published by Philips Data Systems, D.V., Apeldorn, The Netherlands. This publication describes the instruction sets for all P800 series computers as well as systems software. The programming panel PP, therefore, is considered to be a peripheral apparatus in this context, and as far as its communication from and to the computer MC is concerned, its operation fully corresponds to that of other peripheral equipment, notably a control unit. The input/output procedures over said bus GPB of the computer P851 are known from the relevant manuals. Further peripheral apparatus are shown in this example in the form of a number of actuators AC1, ACX and ACY. These actuators, together belonging, for example, to a machine M, are controlled by the computer MC. These actuators also signal back their actions to the computer MC. For example, the actuator ACX is shown as an adjusting device for an X axis which is driven by a transmission CX. Similarly, the actuator ACY is an adjusting device for an Y axis which is driven by way of a transmission GY. The actuator AC1 may serve, for example, for performing a given manipulation in a given XY position. Such a manipulation may be, for example, a spot weld, drilling, cutting, screwing in a screw, etc. In this machine control system, the man-machine interface is very important. As has already been stated, it is desirable that the machine can be made suitable for performing a new task or can be corrected for an old task by programming on site. This means the following: the machine control system has given software, consisting of an execution program and a library (in the computer MC); the software is composed of a number of program blocks which can be used by the operator for drafting a given user program.

Figure 2:
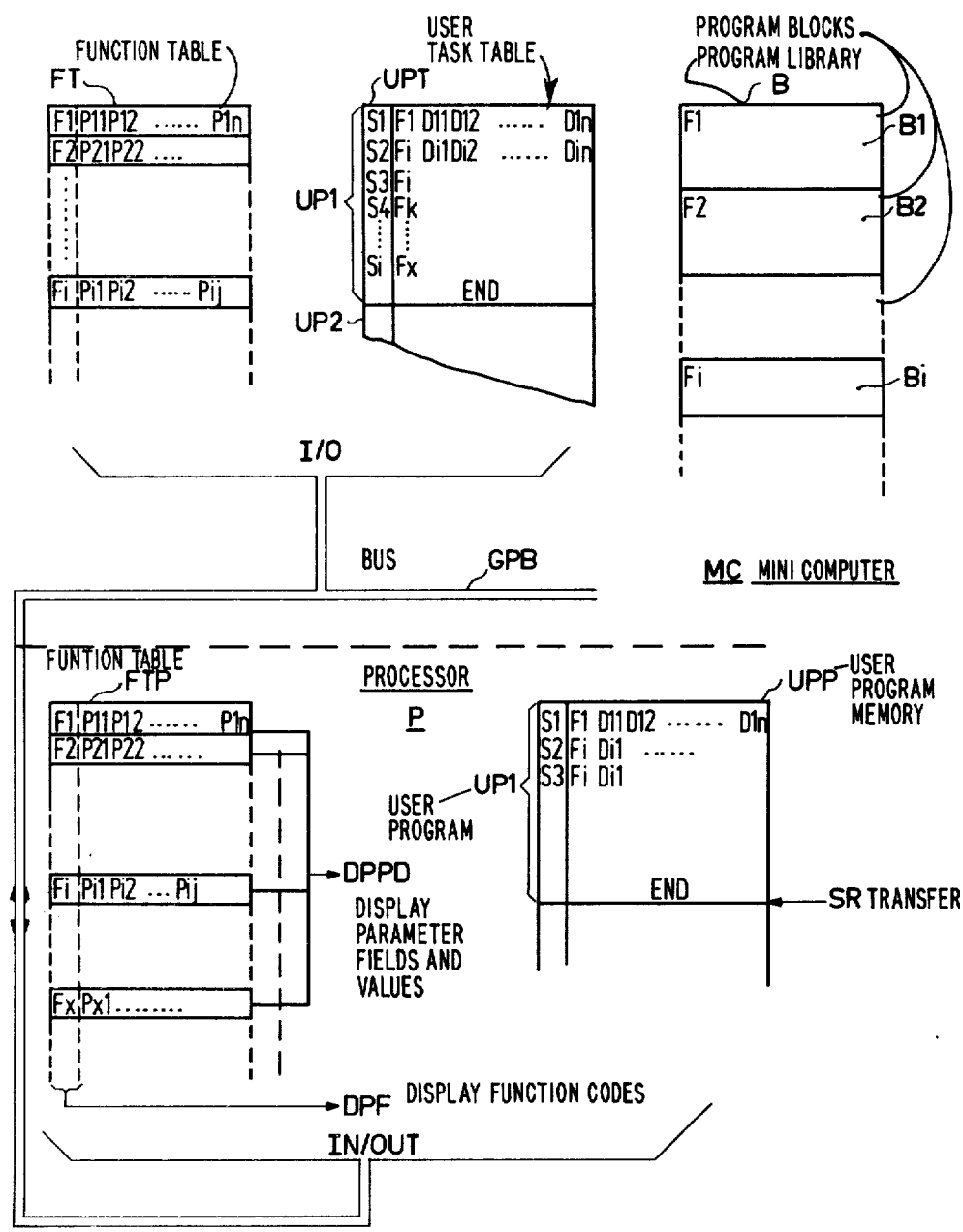
FIG. 2 diagrammatically shows the software background in a system as shown in FIG. 1.

FIG. 2 diagrammatically shows the appearance which said program blocks, a user program and the like may have and also how they are present or can be realized in the computer MC and the processor P of the programming panel.

The program blocks B1, B2, ... Bi ... of the library B are stored in the computer MC. The contents of these blocks are determined by a system development and programming team. The nature, or in other words the field of application, of a relevant machine control system determines the composition of each block or which kinds of blocks are required: each function to be executed in the control system must be defined and programmed in a block. The block B1 concerns the function F1, the block B2 concerns the function F2, etc. The program contents of a block as such are not relevant for the invention, because the invention does not relate to the composition or the execution of a program block. However, for a better understanding of the field of the invention, a complete machine control system, be it in a simplified form, will be described in detail at a later stage. The invention concerns the method of and the means for composing a user program. In a given system involving the designated and described functions F1, F2, ..., the operator can make the machine control system perform a specific task on the basis of these functions which define the field of application. Such tasks (=user programs) UP1, UP2 ... are stored in the computer MC in a task table UPT. Each program UP consists of a number of steps S1, S2, ... up to and including the step "END", which enable the execution of a complete task. A step S1, S2, ... consists of a function Fi which is to be executed in accordance with the contents of the relevant program block Bi. A step (Si) contains, to be chosen by the operator of the system, a given function (Fx) which is to be considered as part of the task. The operator need not only draft a list of functions to be executed for a task, but for each function (Fi) he should also make known to the system the parameter values (Di1, Di2, ... Din) he desires, on the basis of the associated parameters (Pi1, Pi2, ... Pin). This drafting of a list, i.e. a user program, and the inputting of the parameter values form the specific subject of the present application. The basic consideration is to minimize the communication between the programming panel PP at the disposal of the operator and the computer MC of the control system. The following is a description of how this is in principle achieved by the set-up in accordance with the invention.

The computer MC contains a function table FT. This table is directly related to the library B. For each function Fi occurring in B, space is provided, (in practice, this space will concern one or more memory words in the memory of the computer MC) in the table FT which not only contains the code for the relevant function Fi, but also codes for the parameters Pi1, Pi2, ... Pij associated with this function. These parameters may also include maximum value etc. indications. When an operator wishes to loop up the function table FT, via the programming panel, by way of a request for connection to the MC (this is realized according to a standard procedure which is characteristic of a relevant system; for example, a GPB procedure for the P851 computer), this table is transferred, via the bus GPB, to the input unit IN of the processor P of the panel. In the processor, this table FT is stored in the form of a function table for the processor P, denoted by FTP in this embodiment. A given storage space will be available for this purpose in the processor in known manner. In this example, the table FTP not only contains the function Fi and its parameter indications Pij..., but also for each parameter an indication of the field length of these values Dij themselves (for example, n decimals). The processor comprises means whereby first of all the codes for the functions Fi of the table FTP can be displayed in order to designate a number of function selection means of the panel (see further the description given with reference to FIG. 3). This is denoted by DPF in FIG. 2. On the basis of a selection of a given function Fi, subsequently the parameter field with parameter indications Pi1, ... Pij and the parameter value field with the parameter values Di1, ... Dij can be applied to the display means of the panel (see further also FIG. 3) for display. This is indicated by DPPD in FIG. 2.

On the basis of these data in P, the operator can draft a user program UP1 on the panel PP without further communication with the computer MC; see the description given hereinafter with reference to FIG. 3. A program step S1, S2 etc. thus realized can be stored in the processor P. A space UPP in a memory of P can be used for this purpose. When a user program UP1 is ready, denoted by the step END, the program can be transferred, under the control of a command denoted by SR, via the bus GPB, to the computer MC by way of a transfer procedure. Storage then takes place in the table UPT in MC. On the basis of this table, the program can be performed in the machine control system and the operator can check whether the program is being executed to his satisfaction. If not, he can return the program UP1 to the space UPP in the panel. He can then go through the program and make corrections (see FIG. 3 hereinafter), etc.

Using this set-up in accordance with the invention, it is also possible to determine after completion or correction of a given step, what the result will be of such such a step in the machine to be controlled. This serves as a direct check as to what is programmed by the operator. This is effected as follows: after a step Si has been inserted or corrected, the command SR can provide transfer of this step Si to the computer MC. In MC, direct execution can take place, so that the result becomes directly visible. Direct correction is then also possible. Furthermore, there is a possibility of programming which is called "teaching by doing": the machine is moved, for example, by utilizing MOVE buttons (see hereinafter), to a given position. This is included in the program.

It is to be emphasized that machine control systems with user programs per se are known in a wide variety, so that they need not be elaborated herein. An example of such systems is formed by numerically controlled tooling machines (for example, as controlled by the commercially available Philips NC 6600 systems). The subject of the present invention is merely the method of generating or correcting the user programs by means of a programming panel.

Figure 3:
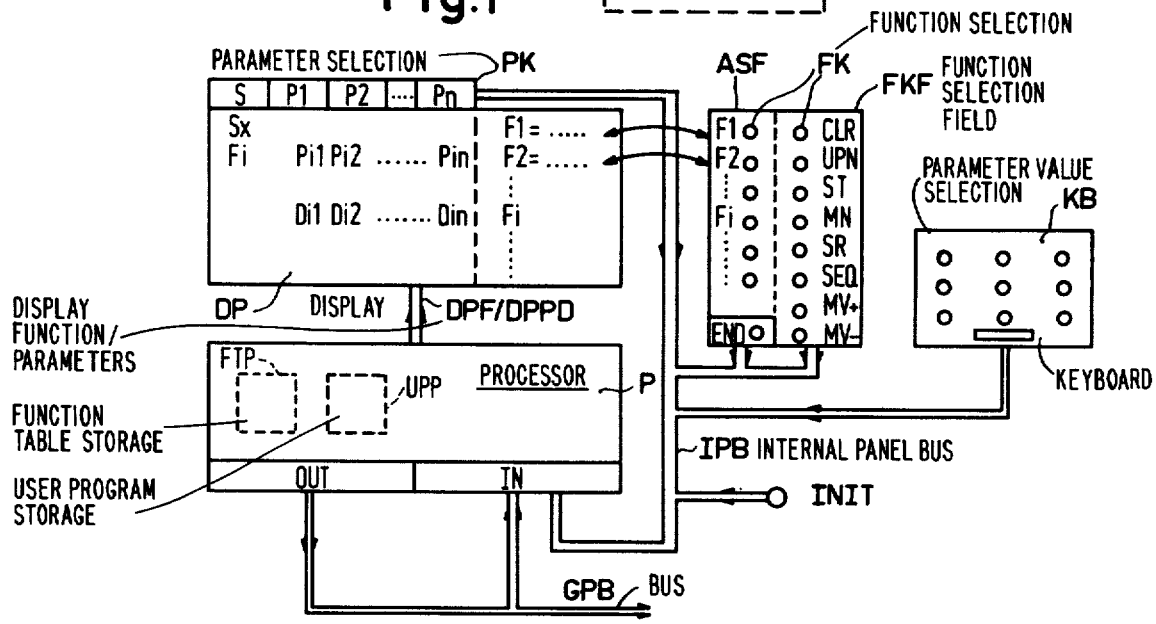
FIG. 3 shows a more elaborated embodiment of a programming panel.

FIG. 3 is a more detailed view of an embodiment of such a programming panel PP. The various units DP, PK, FK and KB are all connected, via an internal panel bus IPB, to the processor P which is preferably a microcomputer comprising a micro-processor. When a programming panel is put into operation, the panel requests, via an appropriate request, for example, by actuation of a knob INIT, via the bus GPB to the computer MC, the function table FT which is stored in the processor in the storage space FTP. The function codes Fi of this table are converted into legible characters and are displayed via the connection DPF, on the display means: F1=..., F2=.... The operator then knows which functions are available for generating a user program associated with the relevant machine control system. For example, F1=welding, F2=cutting, etc. The function selection means FK, included in the function selection field FKF, are arranged as follows: the field ASF includes the function selection means which relate to the specific application of the control system. A function selection means FK, provided with the indication F2, ... Fi, is designated by the relevant text on DP; in this example, F1=welding, etc. The other function selection means CLR, UPN, ST, ... will be described hereinafter. When the operator selects a given function Fi (by actuating the relevant button Fi on the field ASF), the processor P ensures, by way of the transfer channel denoted by DPPD, that the further specification of the Fi from the table FTP appears on the display means: the parameters Pi1, Pi2, ... are displayed on DP in a form which can be understood by the operator. For example: Fi=welding, with Pi1=welding current, Pi2=welding duration, .... At the same time, an indication as regards the parameter value is displayed. For example, a display field with parameter value indications such as Di1=... amperes, Di2=second, .... Using the parameter selection means PK, the operator can select one of the parameters Pi1, Pi2, ... whose value is to be inserted or corrected. As a result of the actuation of the button P1, the processor P knows, via the bus IPB, which parameter is to be inserted or corrected. This insertion or correction is realized by means of the parameter value selection means KB, which may have the form of a keyboard. The values selected are then displayed again on the display means DP in a relevant display field Di1, Di2, .... This completes the description of the functional operation of DP. It is to be noted that the display of information by means of a microprocessor on the display means, for example, a cathode ray tube screen or a light-emitting diode panel, is known per se. The microprocessor processor then serves as a decoding device which converts the applied information into, for example, addresses of a read-only memory which serves as a character generator. Furthermore, the microprocessor processor controls the display means in order to ensure that the characters originating from the character generator appear on the display means in the desired location.

The further operation and the use of the programming panel PP can be described as follows; it is to be noted that this is one of a variety of possibilities, to which the invention is not restricted.

After the operator has gained knowledge of the functions Fi in the described manner, the operator will select or assign a number to a user program UPi (see FIG. 2) which already exists or which he wishes to draft, respectively. This is effected by operation of the button UPN on the function selection means FK. When the relevant number is input at KB, the number of the user program UPi is made known to the processor P. Via GPB, the processor P requests the computer MC to supply the relevant user program UPi from the program table UPT to the processor or to make space available in table for a program to be newly introduced. The program UPi, or the space therefor, is stored in the processor P or is saved therein, respectively: UPP in P (see also FIG. 2). It is to be especially noted that it is also possible that no complete space exists for UPi in UPP in P, but that the entire procedure of retrieving and despatching UPi is replaced by the same procedure, but one step after the other or groups of steps of the program itself: each Si of a UP is separately or group-wise stored, treated and despatched in the memory of P and hence in the programming panel. What actually happens in practice depends on the nature of the programs and the nature of the hardware used.

Using a button S, the operator signals the processor P that he wishes to select a step Sx of the previously selected user program UPi. On the keyboard KB, he introduces the number of the step Sx. Thus, the sequence of the program steps can be fixed or changed, if desired. This is stored in the said space UPP in P. The operator can subsequently concentrate on the generation or modification of a user program step. He expresses this wish by depressing the button SEQ. The processor P then allows generation or correction. In the case of the generation of a new step, he can, if necessary, modify the contents of an old step by means of the knob CLR of FKF. In the case of correction, this is also possible; alternatively, he writes over the previous contents, if necessary. He then selects a function Fi which must be performed in the relevant step Sx: (see above) the parameter indications Pi1, Pi2, . . . appear on DP. The parameter values (if already present and not erased by CLR) Di1, Di2, . . . also appear, or the display fields are indicated. The operator selects a parameter by means of the parameter selection means PK (i.e. by means of one of the buttons P1, P2, . . . ). Via the keyboard KB, a relevant parameter value is then input. This value appears on DP in the relevant display field. Moreover, in reaction to a command SR it is stored, when the operator agrees with this value, in UPP of the processor P, together with the selected function Fi (see also FIG. 2). In this example, SR is a button on the selection panel FKF. Completion of a user program can be indicated by the operator by introducing a function END; this function is present as a function selection button on FKF or can be input via the keyboard. Using the knob SR, the transfer of the contents of the table UPP for this program UPi, via GPB, to the table UPT of the computer MC is initiated. This is realized by way of a normal bus transfer procedure.

A further number of function selection means FK, permanently present on the selection means field FKF as a standard feature, are mentioned hereinafter: ST and MN; these functions enable the user program to run along with the information input via the programming panel. The operator can then directly establish the result thereof on the relevant machine. When MN is depressed, one step of the user program is executed in co-operation with the software contained in the relevant program block Bi. The operator can thus check the result of this one step. For a next step, the button MN must be depressed again. Thus, a correction, if desired, can be performed after each step. When the button ST is depressed, a step of the user program is also executed; as long as ST remains depressed, a next step is subsequently executed, etc.

In this embodiment, further function buttons MV+ and MV− are also present on FKF. These are function buttons which relate to so-called movement primitives: these primitives occur in substantially all fields of application, and hence also in any user program, so that it is practical to incorporate functions of this kind as standard on the programming panel. In this example, concerning the function buttons MV+ and MV− which indicate a movement in one direction (+ is positive) and a movement in another direction (− is negative), respectively, the use and effect can be described as follows: assume that a program step contains position information. The Fi on the display means then indicates, for example: "position". Feasible parameter indications are Pi1=X, which means X-axis information is concerned; Pi2=AC, which means: the acceleration occurring during a movement; and Pi3=V the speed which is of importance in this respect. As data for these parameters, given parameter values, Di1=a distance in meters; Di2=acceleration in m per s$^2$, and Di3=speed in m. per s, can be directly displayed on the display means DP or can be introduced or corrected for display after introduction via the keyboard KB. The use of the function buttons MV+ or MV− in such a situation offers the following possibility: as long as one of the function buttons MV+ or MV− is depressed, an actual displacement in the relevant positive or negative, in this case X-axis, direction is step-wise or continuously performed by the relevant actuator (ACX in FIG. 1), under the control of the computer MC, fed from the programming panel PP via the bus GPB. Consequently, the result of a parameter modification (displacement in this example) becomes directly available: the operator sees, at the area of the machine M, what he actually does by depressing the button MV+ or MV−. The operator shows the system what to do as if it were teaching by doing. When the desired actual position is reached, the operator releases MV+ or MV− so that the parameter value (X) obtained at this instant is inserted; it is displayed on DP and included in the step information present in UPP or transferred to UPT in MC.

Obviously, this direct result constitutes a major advantage: the result of an arbitrary positioning operation in a machine (M) is directly available for evaluation by the operator for the user program. When a given workpiece has been clamped on a machine, which may be completely arbitrarily as fas as the coordinates are concerned, the positioning of a tool can be very simply programmed by the operator as follows: assume that a workpiece has been clamped and the tool, accommodated in a toolholder, can be positioned to a given position of the workpiece by displacement in X, Y and Z axis directions. The starting position of the tool is known in the program: either a zero starting position, for example, at the beginning of the program, or a previous position where the tool was present in accordance with a previous program step. As a result of said action on the programming panel PP, where the MV+, MV− function buttons are successively used in one or more coordinate directions, program steps are provided with the desired position information, supplemented, if necessary, with acceleration and speed information. As a result of this direct interaction between the operator and the machine, substantial time is gained and programming is very simple.

It is to be noted that the parameter indications for frequently occurring functions, such as for this movement function, the parameter indications AC (acceleration), V (speed), can be permanently present in standard form on the programming panel: separate indicators which light up or which are even directly provided with a numerical display facility on which the parameter value is displayed, if the relevant parameter occurs in one or more program steps applied to the programming panel or to be drafted therein (see hereinafter).

If will be obvious from the foregoing that the processor included in the programming panel is capable of realizing, controlling and executing many actions which specifically relate to the function of the panel. Communication with the computer MC in the system will be necessary only a limited number of times. Thus, the computer generally remain available for performing its actual task in such a system, i.e. the execution of the application tasks already filly known to the computer on the basis of already input (and possibly corrected) user program information. As has already been stated, such a computer may attend a plurality of executing machine units, so that the programming of one of these units by the operator will not cause stagnation.

Figure 4:
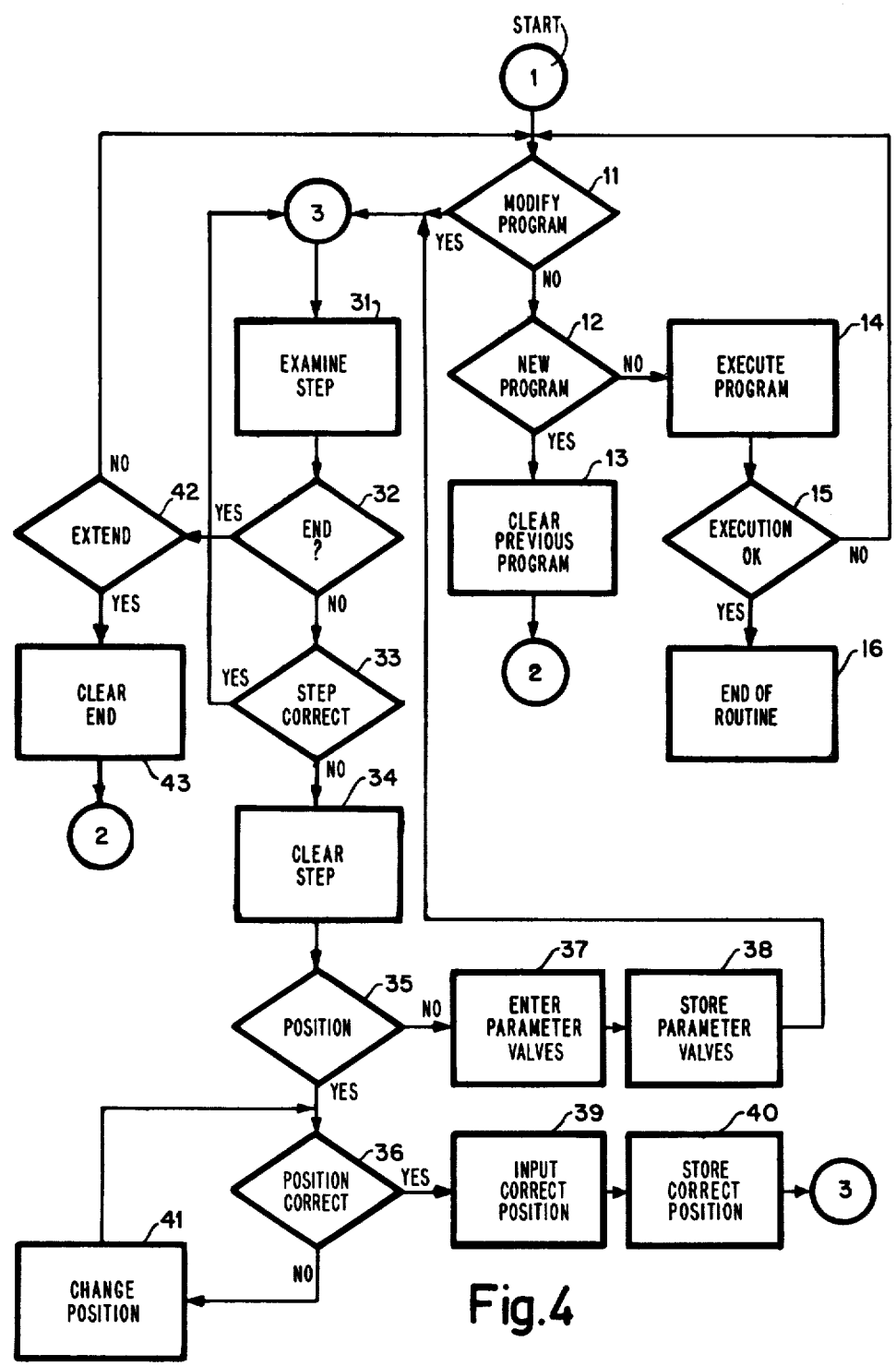
FIGS. 4 and 5 show a flow chart of the operator actions when using the programming panel.
Figure 5:
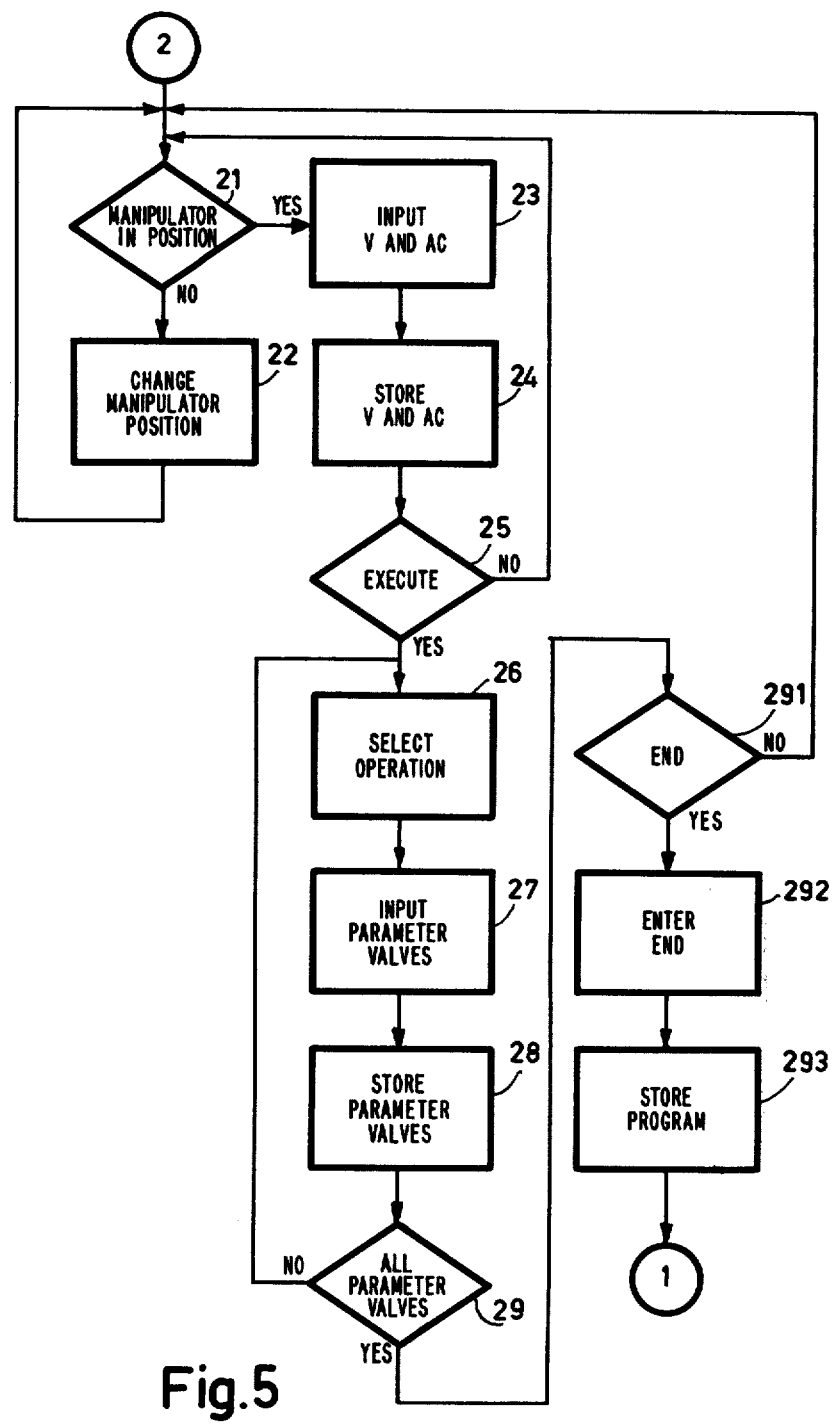

A further advantage of a programming panel as described consists in its flexibility: a programming panel of this kind can be used at different locations because it is provided with some standard functions and because the, preferably programmable, processor is capable of generating or correcting the user programs for different kinds of application fields of machine control systems (determined by relevant function tables FT and associated application program blocks). It can be used as a mobile terminal unit for different machine control systems. An operator can operate a group of machine control systems by means of one and same programming panel. FIG. 4 and FIG. 5 show a flowchart of the operator actions when using the programming panel as described above. This flowchart provides an insight particularly from the point of view of the operator, as to what can be done or executed by means of the various means shown in and described with reference to the FIGS. 1-3. The digit 1 denotes the beginning of the procedure, and the two-digit numbers indicate given phases. The operator has fetched a user program (UPi) on the panel (UPN), (FIG. 3) and this program is available in UPP (FIGS. 2 and 3). The operator can commence his action by using the button SEQ of the selection means FK. The operator takes the first decision (phase 11): is it necessary to modify the user program present? If not, is it perhaps necessary to introduce a new user program (phase 12)? If yes, the previous program (UPi) is removed (phase 13) by means of the function button CLR of the function selection means FK (FIG. 3). This is followed by the procedure denoted by the digit 2 (FIG. 5).

If the decision taken during phase 12 was no, the relevant program can be executed in its entirety (phase 14) by means of the function button ST on the field FKF (FIG. 3). The operator watches the machine M (FIG. 1) to see whether the execution is correct (phase 15). If this is the case, the programming panel may be switched off, removed or utilized immediately for a next user program of the system. If the execution was not correct (no in phase 15), the procedure returns to the phase 11 and the operator again takes a relevant decision. If the program is to be adapted, the procedure goes to stage 3. The operator starts to examine the program one step after the other: by depression of the function button MN (FIG. 3), one step Sx with a function Fi of the program is executed (therefore, proceeding from PP, via GPB, to MC and further, under the control of a relevant application block Bi, to the machine M), phase 31. If this was not the step END (phase 32), it is then decided whether the step Sx (FIG. 3) displayed on the display means DP is correct and has been executed correctly (phase 33) by the relevant actuator of the machine M (FIG. 1). If this is the case, a next step Sx+1 can be examined in stage 3. If the step was the END step (in phase 32), the question arises whether or not the program should be extended (phase 42); if this is not necessary, the procedure returns to the stage 1. If the answer is yes, this END step is removed by means of the button CLR or FK (phase 43). For adding a new step, a change over must be made to stage 2 (FIG. 5). If the answer is no in phase 33, this step is removed from the program by operation of the button CLR (phase 34). In phase 35 it is established whether or not the removed step was a position information step. If so: is the position of the manipulator displaced by the relevant actuator the same as the desired position (phase 36)? If not, this position is changed (phase 41) by means of the buttons MV (MV+ or MV−, FIG. 3), until the correct, desired position is reached. When this position has been reached, the correct speed V and acceleration AC for the displacement to this position must by input via the keyboard (phase 39), see also FIG. 3. Subsequently, this position, together with the associated travel speed and acceleration, can be stored in the memory of P and, after transport, also in the memory of MC. This takes place during the phase 40, using the function button SR on FKF (see FIG. 3). After completion, return to stage 3 is possible. If the step removed in phase 35 was not a position step, the operator changes to the phase 37. Therein, the operator introduces, via the keyboard, the new parameter value of the parameter forming part of the program in this step. For each step, there may also be a plurality of parameters and hence a plurality of parameter values (see also FIG. 3). After that, the value (values) can be stored (phase 38) by operation of the button SR (in UPP of P in the location of the relevant program step, and then in the table UPT of the computer MC by way of a bus transport procedure). When this has taken place, the procedure is again in stage 3 and it is immediately checked whether the step thus corrected is executed in the correct manner (phase 31, etc.).

The following takes place during the stage 2 of the procedure (FIG. 5). A new user program or a new program step starts with the question (phase 21) whether or not the manipulator is in the desired position. If not, this position must be changed (in all desired axis directions) until the desired position is reached. This takes place during phase 22 for each axis direction, using the buttons MV+ and MV− (FIG. 3). When the position is correct in all axis directions, the travel velocity and acceleration are input, via the keyboard KB (FIG. 3), during the phase 23. During the phase 24, these data are stored in the memory (UPP, FIGS. 2, 3) by means of the button SR. During the phase 25, it is examined whether or not an operation must be executed in the position reached. If not, the procedure returns to the stage 2. If the answer is yes, the desired operation is selected during the phase 26: a function button Fi is depressed on ASF, being the application-specific field of the selection means FK (FIG. 3) designated by the display means DP for a given function=operation. A list of parameters Pi1, Pi2, ... and spaces for the parameter values Di1, Di2, ..., then appear on the display means for the selected function. After operation of the parameter selection buttons (P1, P2, ...), one (after the other) parameter value (values) is input via the keyboard KB during the phase 27. The parameter value (values) thus introduced is (are) stored in the memory of the processor P (UPP) during the phase 28, in the location of the relevant program step, including the function indication Fi. Notably if not all parameters of an operation function Fi are simultaneously displayed on DP and interrogated for insertion of the values, phase 29 involves a test to check whether or not all parameter values of this function have been input. If not, the loop from phase 26 is completed once more. When all parameter values have been introduced, a change over is made to phase 291; the question is then: has the end of the program to be introduced been reached? If not, the procedure again starts from the beginning of the stage 2. If yes, the function button END is depressed during the phase 292 (or, if this is effected via the keyboard, END thereon is depressed). Using the button SR, the END step thus generated is inserted. By means of this function button SR, the complete program will then be transferred from the processor memory UPP to the memory UPT of the computer. However, if this transport already takes place for each step of the program (see before, FIG. 3), the latter of course is superfluous. After that, the operator will continue with stage 1 in order to check whether the program thus generated satisfies his requirements.

CONSTRUCTION OF A PROGRAMMING PANEL

An embodiment of a programming panel in accordance with the invention will be described in detail hereinafter with reference to FIGS. 6 to 12. In order to simplify this description, the programming panel is described as being part of a machine control system in which control of the machine, in this example a drive motor, is not provided by a separate computer, but rather by the processor of the programming panel itself. Moreover, for the sake of simplicity the construction of the display means is chosen in the form of lamps arranged underneath the buttons present.

Figure 6:
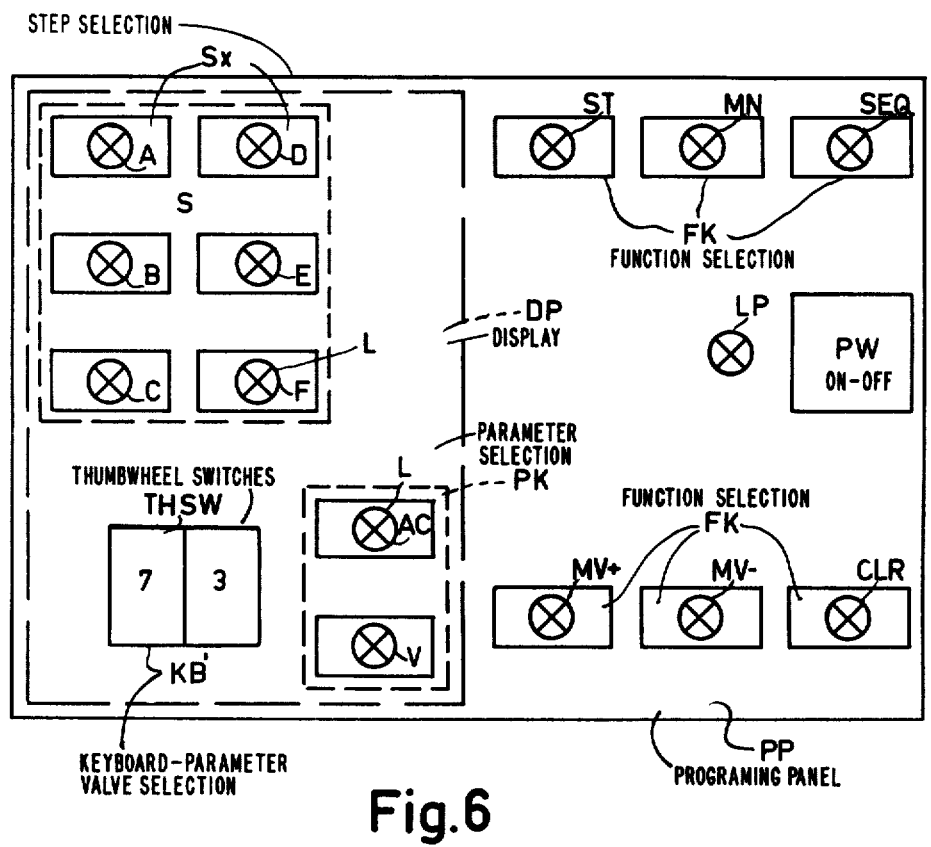
FIG. 6 shows a diagram of a simplified programming panel.

FIG. 6 is a front view of the programming panel PP to be described. The display means DP are arranged in the rectangle (denoted by a broken line) at the left in the Figure. Because only one function Fi is realized in this panel, i.e. a displacement function along one or more given axes (X, Y, Z axis), this function Fi is not separately displayed on the panel. The parameters of this function, however, are separately shown: speed V and acceleration AC. These parameters are made visible by means of lamps L underneath the buttons V and AC, respectively, on DP. The buttons themselves form the parameter selection means PK. The parameter value selection means are denoted by KB'. In this embodiment, there are two thumb wheel switches THSW whereby numbers of two decimals can be adjusted and which also display the selected number. These thumb wheel switches THSW thus also form part of the display means DP. For generating or correcting a user program, it is possible to select a given program step: Sx. This is effected by means of buttons (Sx) provided with lamps L in the field denoted by S. When a button Sx is depressed upon selection of a step Sx, i.e. one of the steps A-F, the relevant lamp L lights up. This also takes place when the program passes the step Sx with the relevant address A, B, ... F. The panel PP also comprises function selection means FK, notably for a number of standard functions: ST, MN, SEQ, MV+, MV− and CLR. These functions have already been described with reference to FIG. 3. The implementation of the functions on the panel of FIG. 6 follows from the Figures described hereinafter. In order to indicate whether or not the relevant buttons are depressed, these buttons ST, ... are also provided with lamps L. The panel is switched-on by means of a button PW, a lamp LP then indicating that the system is ready for operation.

Figure 7:
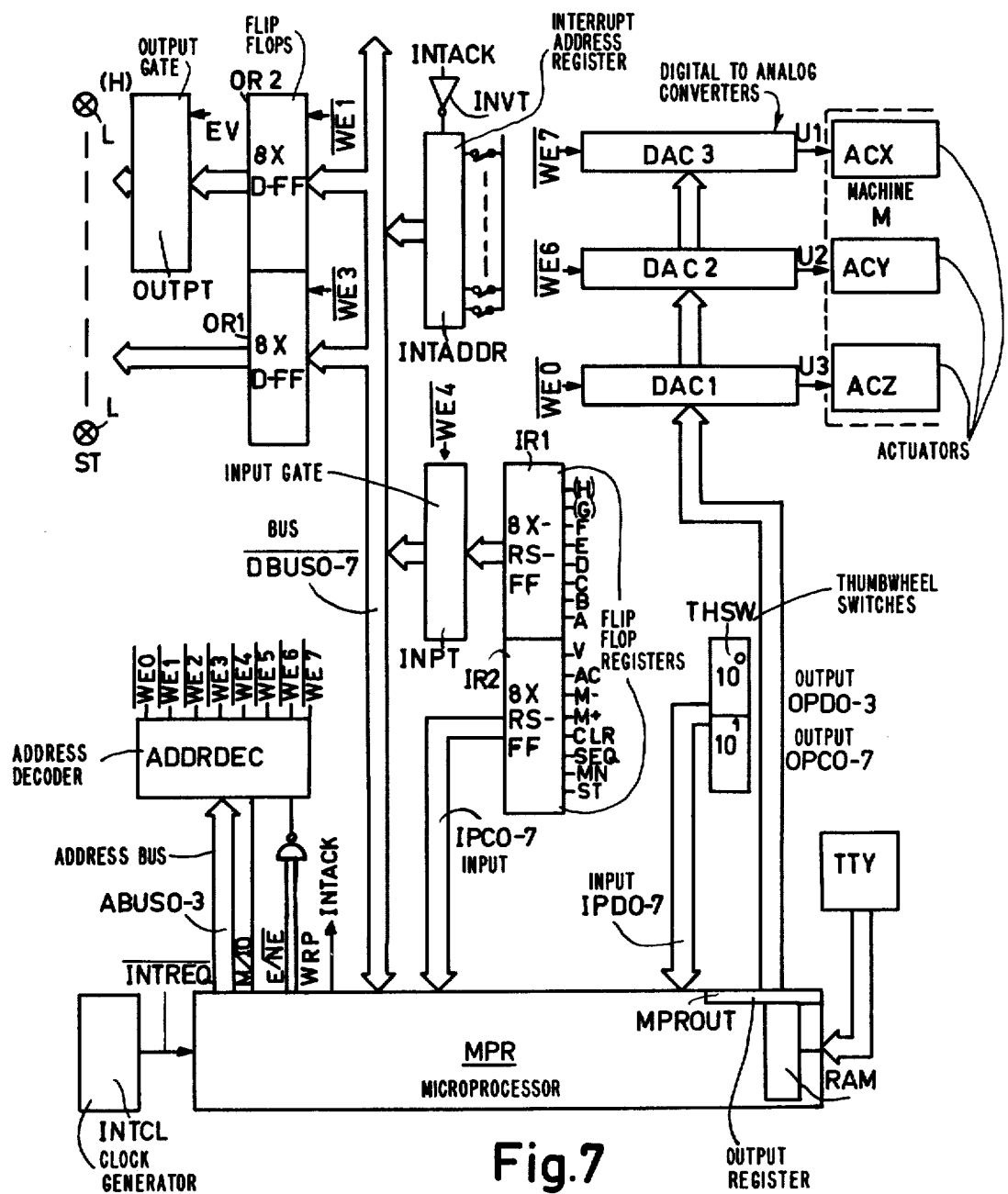
FIG. 7 shows a block diagram of a machine control system, comprising a processor which is constructed as a micro-computer.

FIG. 7 shows a block diagram of a complete machine control system according to this simple set-up. MPR forms the processor, which is in this case a micro-computer of the type PC 1001 marketed by Signetics. This micro-computer contains the Signetics 2650 microprocessor. The machine M to be controlled comprises three actuators ACX, ACY and ACZ which are connected to outputs U1, U2 and U3. The input and output units between the micro-computer MPR and the button and machine interface are formed by the 2×8 bit input and the 2×8 bit output of MPR: IPC 0–7, IPD 0–7 and OPC 0–7, OPD 0–7, respectively. Only OPD 0–3 of the latter outputs are used, as is shown in FIG. 7. Via a bus DBUS 0–7, further inputs exist in the form of an 8-bit input gate INPT, having an address $\overline{WE4}$, and an 8-bit interrupt address register INTADDR with a take-over condition INTACK. Via DBUS 0–7, further outputs are present in the form of two 8-bit D-type flipflop registers OR1, OR2 (8×D-FF) with take-over addresses $\overline{WE3}$ and $\overline{WE1}$. OR2 furthermore comprises an output gate OUTPT which comprises an additional input EV. The lamps L of the display means and other (function) buttons are operated by these outputs. The inputs from the buttons A-F (there are still vacant positions G and H) extend via an 8-bit RS flipflop register IR1, while the buttons V, AC, ... ST are connected via a second 8-bit RS flipflop register IR2. The thumb wheel switches THSW (10', 10") are connected to MPR via the inputs IPD 0–7. For the control of the machine M, three digital/analog converters DAC 1, DAC 2 and DAC 3, preceded by associated take-over registers, are included for receiving the control information from the micro-computer MPR (output register MPROUT). These converters are addressed by addresses $\overline{WE0}$, $\overline{WE6}$ and $\overline{WE7}$. The information enters these digital-/analog converters via the lines OPC 0–7 and OPD 0–3.

The said take-over addresses $\overline{WE0}$–$\overline{WE7}$ are formed, via the address bus ABUS 0–3, in a decoding device ADDRDEC. Further control lines M/IO, E/NE, WRP, EV will be described hereinafter. In this embodiment, the reference TTY indicates that the program for the system has been input, via an input device, in a memory RAM of the micro-computer MPR. In these surroundings, it is alternatively possible for the system application program to be permanently stored in, for example, a read-only memory of the MPR. The reference INTCL in FIG. 7 denotes an adjustable clock generator which supplies an interrogation pulse after a preset time interval. This results in an output signal INTREQ whereby MPR can be interrupted. It is thus possible to operate in simulated real-time surroundings.

Figure 8:
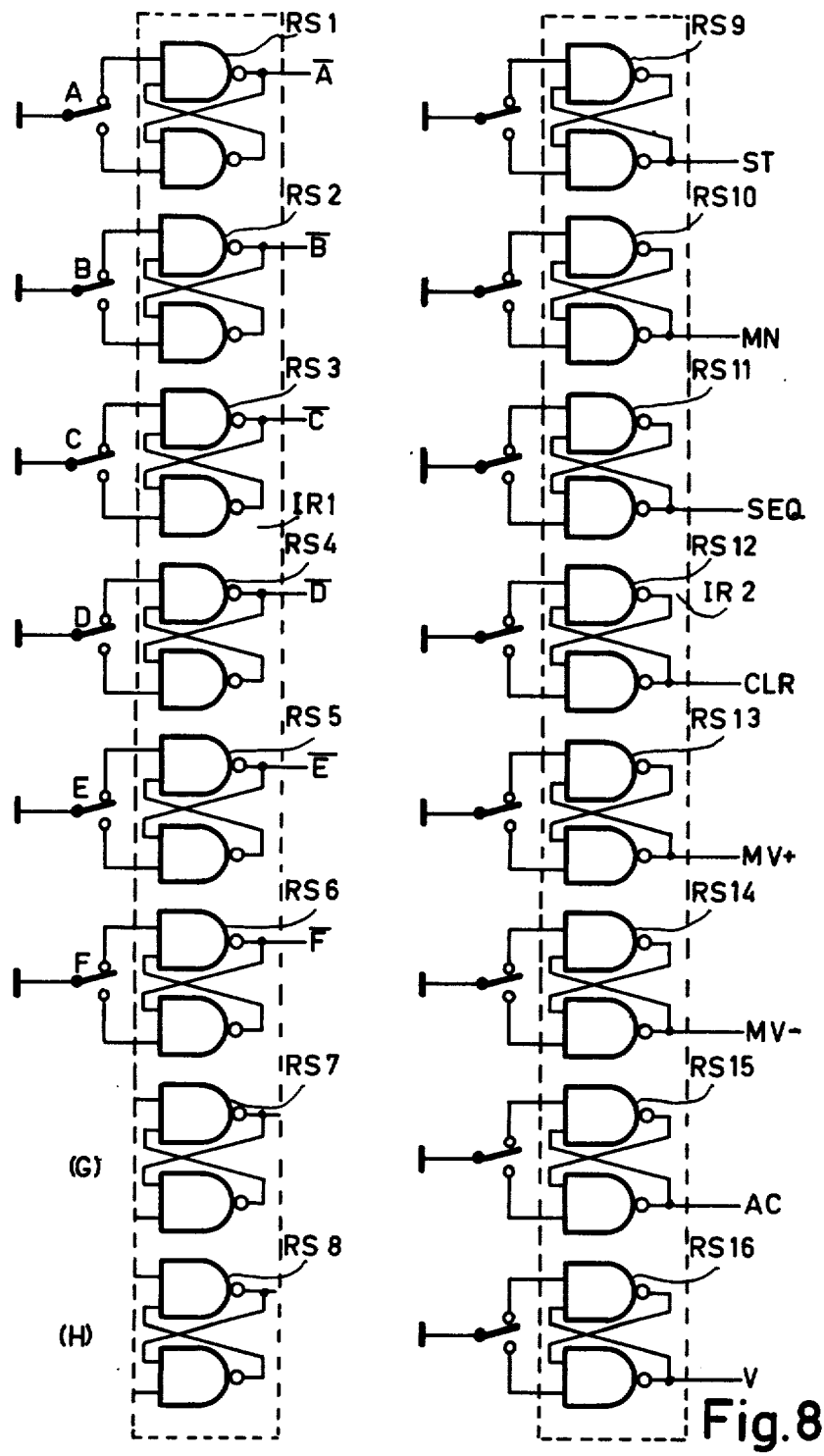
Figure 9:
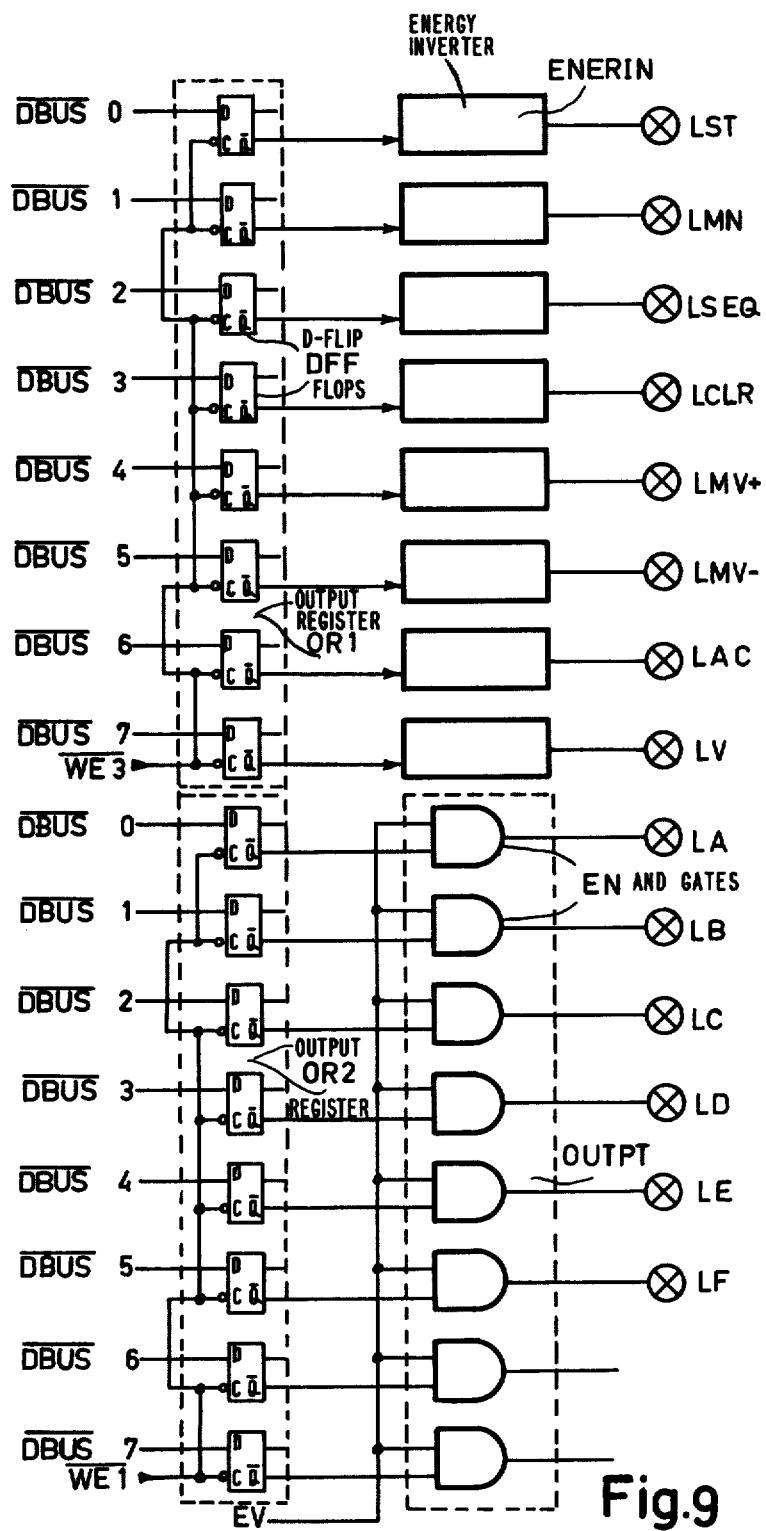

The information of the buttons on the programming panel PP should be applied to the micro-computer MPR in a vibration-free manner. FIG. 8 shows that the vibrating of the buttons is eliminated by the use of 16 RS flipflops RS1–RS16 which form the registers IR1 and IR2 of FIG. 7, two of these flipflops (RS7 for G and RS8 for H) serving as spares. The outputs A–F of these flipflops are connected to the input register INPT (see FIG. 7 and also FIG. 10), and the outputs ST-V of these flipfops are directly connected to the inputs IPC 0–7 of MPR (FIG. 7). When the micro-computer is activated for a function requested by one of the buttons for execution, the corresponding indication is given. In this embodiment, this is realized by way of said lamps Li. FIG. 9 shows how the lamps Li are controlled by the microcomputer. The relevant data for such a lamp Li are received, via the bus DBUS 0–7, in the output registers OR1 and OR2 (see also FIG. 7). These registers are composed of the D-flipflops DFF shown in FIG. 9 which forward a so-termed "light-up command" for a lamp from the bus DBUS 0–7 when a take-over address $\overline{WE3}$ or $\overline{WE1}$ is also present on an other input of a D-flipflop. The outputs of the register OR1 are directly connected to an energy inverter ENERIN, provided for each lamp LST, LMN, LSEQ, LMV+, LMV−, LAC and LV, in which the supply voltage is applied to a lamp in known manner by way of some electronic elements. The outputs of the register OR2 are connected, via AND-function gates of the output gate OUTPT, to said energy inverters ENERIN of the lamps LA, LB, ... LF. By means of these AND-function gates EN, it is possible to associated an additional condition with the lighting up or not of the lamp. This is denoted by way of the input EV in FIG. 9.

The reference INPT in FIG. 10 denotes the input gate INPT for the input of the button condition of the buttons A–F for addressing the program steps. The parts INPT1 and INPT2 shown in FIG. 10 are known three-position buffers whose input receives the conditions A–F (and G and H) originating from the RS-flipflops (FIG. 8, RS1–RS6 and the spares RS7 and RS8). By means of the address $\overline{WE4}$, these buffers can be activated so that the information is applied to the bus DBUS 0–7. The required address decoding is provided by the decoder ADDRDEC, FIG. 11 (and also FIG. 7). It is a 1-out-of-16 decoder which is connected to the address bus ABUS lines ABUS0-3 from the micro-computer. This decoder may be activated only when an input/output operation is concerned. This is realized by the command M/I$\phi$, in conjunction with a command E/NE originating from the MPR. (This is necessary because the same address bus is also used for addressing in the memory of the MPR). The MPR also supplies a write pulse WRP which executes the input/output operation: in NAND-gate NEN, the commands E/NE and the WRP are combined. This is done to ensure that the operation takes place in a time interval in which stable conditions have been reached in the registers, so that no uncertainties can arise.

As has already been stated in the description of FIG. 9, real-time operation of this system is provided. An interrupt request INTREQ can be applied from the generator INTCL to MPR. When this request is granted, an interrupt acknowledge signal INTACK appears. The micro-processor is then in a state enabling a jump function to be performed. The jump address may then be inserted on the register INTADDR. FIG. 12 shows how this can be realized in practice. After inversion of INTACK in INVT, INTACK activates the three-position buffers DSB of the register INTADDR. The inputs of the DSB are connected to switches SW1–SW7. The setting thereof then supplies the relevant interrupt address.

SOFTWARE FOR THE PROGRAMMING PANEL

Because the described programming panel utilizes a micro-processor of the type Signetics 2650, the software should be based on the available data of the 2650. The desired instructions can be found in relevant publications, etc. An example in this respect is the 2650 Microprocessor Manual, Copyright April 1975, Signetics Corporation, which describes the instruction set.

The software described below has been realized on the basis of these data. The program list is also included in the description below.

The software for this programming panel has been described against the background of the control for one or more analog servo motors. The function of the panel in this situation consists of the generating and correcting of a user program which describes the movements to be executed by the servo motors. The software required to enable this panel to perform this function has been written as a system of subroutines in order to obtain a clear set-up. Secondly, it is intended to offer the possibility of constructing a specific panel by means of a number of these subroutines (modular construction). Each of these subroutines will be briefly described hereinafter.

SUBROUTINE TERMINATE

As soon as the program for the panel is liable to reach a waiting phase, a jump is made to the subrountine TERMINATE. In TERMINATE, the buttons speed V, acceleration AC, movement positive MV+, movement negative MV−, CLR, SEQ and ST are continuously sensed. At the instant at which the program encounters a depressed button, the program jumps to IN1 where detection takes place as to which button is depressed. IN1 decodes the 8-bit word in the register IR2. Via the function table FTP (see FIG. 2), the relevant function with associated subroutine is retrieved and the program reaches, via SCHD, the subroutine associated with the relevant button.

SUBROUTINE DECIMAL TO BINARY CONVERSION.

This subroutine is addressed when the buttons speed (V) and acceleration (AC) are depressed. The position of the thumb wheel switches THSW on the panel PP is then read. The thumb wheel switches offer a decimal number. For later use of this number in a control program, it must be converted into an 8-bit binary number.

SUBROUTINE MOVE (MV+, MV−)

The program reaches this subroutine when use is made of the buttons movement positive MV+ (MPOS) or movement negative MV− (MMIN). This subroutine results in the number in the output register in MPR to the DAC1, DAC2 and DAC3 digital-to-analog converters being increased or decreased as long as one of the two buttons remains depressed. The acceleration number then determines the step size and the speed number determines the time delay between the issuing of two steps.

The indication lamp of the buttons MV+ and MV− remains lit for as long as the relevant button is depressed. A test in the program monitors the overflowing of the 12-bit output register MPROUT in MPR both at the upper and the lower limit. When the register contains its maximum or minimum permissible value, the supply of further steps to this register is blocked. This situation can be signalled in that the lamp of MV+ or MV− starts to flash. Flashing continues until the button of the other direction is depressed. The flashing can be controlled by a circulating counter; this is the subroutine "COUNTER" in the program. While one of the lamps flashes, no action other than depression of the button of the other direction is possible.

SUBROUTINE SEQUENCE AND CLEAR.

Depression of the button SEQ causes the program to jump to the subroutine SEQUENCE. As long as the micro-processor is in this routine, the data of the user program can be input or those of the program possibly present in the memory can be modified.

The subroutine CLEAR, initiated by the button CLR on the panel, can be used for resetting the register containing the information for the indication lamps during the correction of a user program.

SUBROUTINE OUTPUT.

The subroutine MOVE as well as START/MANUAL utilize this output subroutine module. This module first of all inserts the number V in a register and causes this register to count down to zero. An adjustable time delay between two successive output interrogation instants is thus obtained. Subsequently, the least-significant bits of the word to be output are written into a C register of the PC 1001 micro-computer (OPC 0–7).

Subsequently, the four remaining, most significant bits are applied to a D-register (OPD 0–3).

The information of the 12-bit word is then ready for transfer in one operation to a take-over register, provided before the digital/analog converters DAC1, DAC2 and DAC3 on the lines OPC 0–7 and OPD 0–3. This is effected by an extended output where 8 bits of the address register of the micro-processor are simultaneously available for addressing the output. At this instant, the addresses "00" ($\overline{WEO}$), "06" ($\overline{WE6}$), "07" ($\overline{WE7}$) are used for generating a takeover pulse for said registers at DCA1-DAC3.

SUBROUTINE START/MANUAL.

The subroutine START/MANUAL enables the application program to run along with the information of the user program input via the panel. When the button ST of the panel is depressed, the application program is executed on the basis of one step of the user program. After completion thereof, it is established whether the button ST is still depressed. If this is no longer the case, a change-over is made to the routine TERMINATE; otherwise, the application program continues with the following step of the user program. In the MANUAL mode, contrary to the START mode, the next step of the user program is executed only after renewed depression of the button MN. This enables the operator to check the correctness of the user program one step after the other, and to correct the program, if necessary; see also the description given with reference to the FIGS. 4 and 5.

The following pages contain the program list of an example of a test program in order to demonstrate that the system operates, said program being associated with the system described with reference to the FIGS. 6–12 and the described routines. PIP is the name of the assembly program for assembling 2650 programs. B1, . . . B4 means byte 1, . . . byte 4 of the object code of the associated assembler instruction.

| PIP ASSEMBLER | | | | | | | | |
|---|---|---|---|---|---|---|---|---|
| LINE | ADDR | B1 | B2 | B3 | B4 ERR | | SOURCE | |
| 1 | | | | | | * SUBROUTINE TERMINATE | | |
| 2 | | | | | | * | | |
| 3 | | | | | | * | | |
| 4 | | | | | | | ORG | H'43F' |
| 5 | 043F | 76 | 40 | | | | PPSU | H'40' |
| 6 | 0441 | 04 | 00 | | | | LODI,0 | H'00' |
| 7 | 0443 | CC | 04 | BB | | | STRA,0 | FLAG |
| 8 | 0446 | CC | 05 | 4C | | | STRA,0 | DWG1 |
| 9 | 0449 | CC | 05 | 4D | | | STRA,0 | DWG2 |
| 10 | 044C | CC | 06 | E5 | | | STRA,0 | XREG |
| 11 | 044F | D4 | 01 | | | | WRTE,0 | H'01' |
| 12 | 0451 | 04 | 01 | | | | LODI,0 | H'01' |
| 13 | 0453 | CC | 06 | E6 | | | STRA,0 | LREG |
| 14 | 0456 | 04 | 00 | | | TERM | LODI,0 | H'00' |
| 15 | 0458 | CC | 06 | E4 | | | STRA,0 | STAT |
| 16 | 045B | D4 | 03 | | | | WRTE,0 | H'03' |
| 17 | 045D | 30 | | | | | REDC,0 | |
| 18 | 045E | 18 | 76 | | | | BCTR,0 | TERM |
| 19 | 0460 | C2 | | | | | STRZ | 2 |
| 20 | 0461 | 05 | 00 | | | | LODI,1 | H'00' |
| 21 | 0463 | 44 | 01 | | | INI | ANDI,0 | H'01' |
| 22 | 0465 | 98 | 07 | | | | BCFR,0 | KNOB |
| 23 | 0467 | 02 | | | | | LODZ | 2 |
| 24 | 0468 | 50 | | | | | RRR,0 | |

PIP ASSEMBLER

| LINE | ADDR | B1 | B2 | B3 | B4 | ERR | SOURCE | | |
|---|---|---|---|---|---|---|---|---|---|
| 25 | 0469 | C2 | | | | | | STRZ | 2 |
| 26 | 046A | 85 | 03 | | | | | ADDI,1 | H'03' |
| 27 | 046C | 18 | 75 | | | | | BCTR,3 | INI |
| 28 | | | | | | | * KNOB FOUND | | |
| 29 | 046E | CD | 04 | BC | | | KNOB | STRA,1 | SAVE |
| 30 | 0471 | 0F | 04 | BC | | | | LODA,3 | SAVE |
| 31 | 0474 | 9F | 04 | 77 | | | | BXA | SCHD,R3 |
| 32 | 0477 | 1F | 04 | 8F | | | SCHD | BCTA,3 | V |
| 33 | 047A | 1F | 04 | 99 | | | | BCTA,3 | A |
| 34 | 047D | 1F | 04 | A9 | | | | BCTA,3 | MMIN |
| 35 | 0480 | 1F | 04 | A3 | | | | BCTA,3 | MPOS |
| 36 | 0483 | 1F | 05 | 9F | | | | BCTA,3 | CLR |
| 37 | 0486 | 1F | 05 | 4E | | | | BCTA,3 | SEQ |
| 38 | 0489 | 1F | 05 | CB | | | | BCTA,3 | MAN |
| 39 | 048C | 1F | 05 | A9 | | | | BCTA,3 | STRT |
| 40 | | | | | | | * SPEED (SPD) | | |
| 41 | 048F | 3F | 04 | BD | | | V | BSTA,3 | DBC |
| 42 | 0492 | CC | 04 | 98 | | | | STRA,0 | SPD |
| 43 | 0495 | 1F | 04 | 56 | | | | BCTA,3 | TERM |
| 44 | 0498 | | | | | | SPD | RES | |
| 45 | | | | | | | * ACCELERATION (ACCEL) | | |
| 46 | 0499 | 3F | 04 | BD | | | A | BSTA,3 | DBC |
| 47 | 049C | CC | 04 | A2 | | | | STRA,0 | ACCEL |
| 48 | 049F | 1F | 04 | 56 | | | | BCTA,3 | TERM |
| 49 | 04A2 | | | | | | ACCEL | RES | 1 |
| 50 | | | | | | | * MOVE POSITIV | | |
| 51 | 04A3 | 3F | 04 | D8 | | | MPOS | BSTA,3 | MOVE |
| 52 | 04A6 | 1F | 04 | 56 | | | | BCTA,3 | TERM |
| 53 | | | | | | | * MOVE NEGATIV | | |
| 54 | 04A9 | 0C | 04 | BB | | | MMIN | LODA,0 | FLAG |
| 55 | 04AC | 84 | 01 | | | | | ADDI,0 | H'01' |
| 56 | 04AE | CC | 04 | BB | | | | STRA,0 | FLAG |
| 57 | 04B1 | 3F | 04 | D8 | | | | BSTA,3 | MOVE |
| 58 | 04B4 | 04 | 00 | | | | | LODI,0 | H'00' |
| 59 | 04B6 | C8 | 03 | | | | | STRR,0 | FLAG |
| 60 | 04B8 | 1F | 04 | 56 | | | | BCTA,3 | TERM |
| 61 | 04BB | | | | | | FLAG | RES | 1 |
| 62 | 04BC | | | | | | SAVE | RES | 1 |
| 63 | | | | | | | * | | |
| 64 | | | | | | | * SUBR DEC. TO BIN. CONV. | | |
| 65 | | | | | | | * | | |
| 66 | | | | | | | * | | |
| 67 | 04BD | 70 | | | | | DBC | REDD,0 | |
| 68 | 04BE | 24 | FF | | | | | EORI,0 | H'FF' |
| 69 | 04C0 | CC | 04 | D6 | | | | STRA,0 | NUMBER |
| 70 | | | | | | | * SAVE FIRST DECIMAL | | |
| 71 | 04C3 | 44 | 0F | | | | | ANDI,0 | H'0F' |
| 72 | 04C5 | CC | 04 | D7 | | | | STRA,0 | FST DEC. |
| 73 | | | | | | | * SAVE SEC. DECIMAL | | |
| 74 | 04C8 | 0C | 04 | D6 | | | | LODA,0 | NUMBER |
| 75 | 04CB | 44 | F0 | | | | | ANDI,0 | H'F0' |
| 76 | | | | | | | * | 10 MULTIPLY | |
| 77 | 04CD | 50 | | | | | | RRR,0 | |
| 78 | 04CE | C1 | | | | | | STRZ | 1 |
| 79 | 04CF | 50 | | | | | | RRR,0 | |
| 80 | 04D0 | 50 | | | | | | RRR,0 | |
| 81 | 04D1 | 81 | | | | | | ADDZ | 1 |
| 82 | 04D2 | 8C | 04 | D7 | | | | ADDA,0 | FST DEC. |
| 83 | 04D5 | 17 | | | | | | RETC,3 | |
| 84 | 04D6 | | | | | | NUMB | RES | 1 |
| 85 | 04D7 | | | | | | FTDC | RES | 1 |
| 86 | | | | | | | * | | |
| 87 | | | | | | | * SUBROUT MOVE | | |
| 88 | | | | | | | * | | |
| 89 | | | | | | | * | | |
| 90 | | | | | | | * NEG OR POS | | |
| 91 | 04D8 | 0C | 04 | BB | | | MOVE | LODA,0 | FLAG |
| 92 | 04DB | 44 | 01 | | | | | ANDI,0 | H'01' |
| 93 | 04DD | 18 | 07 | | | | | BCTR,0 | POS |
| 94 | | | | | | | * LAMP NEG ON | | |
| 95 | 04DF | 04 | 20 | | | | | LODI,0 | H'20' |
| 96 | 04E1 | D4 | 03 | | | | | WRTE,0 | H'03' |
| 97 | 04E3 | 1F | 05 | 12 | | | | BCTA,3 | NEG |
| 98 | | | | | | | * LAMP POS ON | | |
| 99 | 04E6 | 04 | 10 | | | | POS | LODI,0 | H'10' |
| 100 | 04E8 | D4 | 03 | | | | | WRTE,0 | H'03' |
| 101 | | | | | | | * D/A NUMBER INCREASE | | |
| 102 | 04EA | 0D | 05 | 4C | | | | LODA,1 | DWG1 |
| 103 | 04ED | 8D | 04 | A2 | | | | ADDA,1 | ACCEL |
| 104 | 04F0 | CD | 05 | 4C | | | | STRA,1 | DWG1 |

-continued

PIP ASSEMBLER

| LINE | ADDR | B1 | B2 | B3 | B4 | ERR | SOURCE | | |
|---|---|---|---|---|---|---|---|---|---|
| 105 | | | | | | | * CARRY CONTROL | | |
| 106 | 04F3 | 13 | | | | | | SPSL | |
| 107 | 04F4 | 44 | 01 | | | | | ANDI,0 | H'01' |
| 108 | 04F6 | 8C | 05 | 4D | | | | ADDA,0 | DWG2 |
| 109 | 04F9 | CC | 05 | 4D | | | | STRA,0 | DWG2 |
| 110 | 04FC | 75 | 01 | | | | | CPSL | H'01' |
| 111 | 04FB | 44 | F0 | | | | | ANDI,0 | H'F0' |
| 112 | | | | | | | * VALUE TOO LARGE | | |
| 113 | 0500 | 1C | 05 | 3E | | | | BCTA,0 | CNT |
| 114 | 0503 | 06 | 10 | | | | | LODI,2 | H'10' |
| 115 | 0505 | 3F | 06 | E9 | | | FTPS | BSTA,3 | CNTR |
| 116 | 0508 | 26 | 10 | | | | | EORI,2 | H'10' |
| 117 | 050A | D6 | 03 | | | | | WRTE,2 | H'03' |
| 118 | 050C | 30 | | | | | | REDC,0 | |
| 119 | 050D | 44 | 04 | | | | | ANDI,0 | H'04' |
| 120 | 050F | 18 | 74 | | | | | BCTR,0 | FTPS |
| 121 | 0511 | 37 | | | | | | RETE,3 | |
| 122 | | | | | | | * D/A NUMBER DECREASE | | |
| 123 | 0512 | 0D | 05 | 4C | | | NEG | LODA,1 | DWG1 |
| 124 | 0515 | AD | 04 | A2 | | | | SUBA,1 | ACCEL |
| 125 | 0518 | CD | 05 | 4C | | | | STRA,1 | DWG1 |
| 126 | 051B | 13 | | | | | | SPSL | |
| 127 | 051C | 44 | 01 | | | | | ANDI,0 | H'01' |
| 128 | 051E | 24 | 01 | | | | | EORI,0 | H'01' |
| 129 | 0520 | C1 | | | | | | STRZ | 1 |
| 130 | 0521 | 0C | 05 | 4D | | | | LODA,0 | DWG2 |
| 131 | 0524 | A1 | | | | | | SUBZ | 1 |
| 132 | 0525 | CC | 05 | 4D | | | | STRA,0 | DWG2 |
| 133 | 0528 | 75 | 01 | | | | | CPSL | H'01' |
| 134 | | | | | | | *NEG VALUE TOO SMALL | | |
| 135 | 052A | 44 | F0 | | | | | ANDI,0 | H'F0' |
| 136 | 052C | 1C | 05 | 3E | | | | BCTA,0 | CNT |
| 137 | 052F | 06 | 20 | | | | | LODI,2 | H'20' |
| 138 | 0531 | 3F | 06 | E9 | | | FTNG | BSTA,3 | CNTR |
| 139 | 0534 | 26 | 20 | | | | | EORI,2 | H'20' |
| 140 | 0536 | D6 | 03 | | | | | WRTE,2 | H'03' |
| 141 | 0538 | 30 | | | | | | REDC,0 | |
| 142 | 0539 | 44 | 08 | | | | | ANDI,0 | H'08' |
| 143 | 053B | 18 | 74 | | | | | BCTR,0 | FTNG |
| 144 | 053D | 37 | | | | | | RETE,3 | |
| 145 | 053E | 3F | 05 | 89 | | | CNT | BSTA,3 | OUTP |
| 146 | | | | | | | * KNOB STILL PRESSED | | |
| 147 | 0541 | 30 | | | | | | REDC,0 | |
| 148 | 0542 | 34 | | | | | | RETE,0 | |
| 149 | 0543 | 0C | 04 | BB | | | | LODA,0 | FLAG |
| 150 | 0546 | 1C | 04 | E6 | | | | BCTA,0 | POS |
| 151 | 0549 | 1F | 05 | 12 | | | | BCTA,3 | NEG |
| 152 | 054C | | | | | | DWG1 | RES | 1 |
| 153 | 054D | | | | | | DWG2 | RES | 1 |
| 154 | | | | | | | * | | |
| 155 | | | | | | | * SUBR SEQUENCE | | |
| 156 | | | | | | | * | | |
| 157 | | | | | | | * | | |
| 158 | 054E | 04 | 04 | | | | SEQ | LODI,0 | H'04' |
| 159 | 0550 | 54 | 03 | | | | | WRTE,0 | H'03' |
| 160 | 0552 | 54 | 04 | | | | | REDE,0 | H'04' |
| 161 | 0554 | 18 | 78 | | | | | BCTR,0 | SEQ |
| 162 | 0556 | C2 | | | | | | STRZ | |
| 163 | 0557 | 88 | 23 | | | | | ADDR,0 | LAMP |
| 164 | 0559 | D4 | 01 | | | | | WRTE,0 | H'01' |
| 165 | 055B | C8 | 1F | | | | | STRR,0 | LAMP |
| 166 | 055D | 02 | | | | | | LODZ | 2 |
| 167 | 055E | 05 | 00 | | | | | LODI,1 | H'00' |
| 168 | 0560 | 44 | 01 | | | | WKN | ANDI,0 | H'01' |
| 169 | 0562 | 98 | 07 | | | | | BCFR,0 | KNA |
| 170 | 0564 | 02 | | | | | | LODZ | 2 |
| 171 | 0565 | 50 | | | | | | RRR,0 | |
| 172 | 0566 | C2 | | | | | | STRZ | 2 |
| 173 | 0567 | 85 | 02 | | | | | ADDI,1 | H'02' |
| 174 | 0569 | 1B | 75 | | | | | BCTR,3 | WKN |
| 175 | 056B | 0C | 05 | 4C | | | KNA | LODA,0 | DWG1 |
| 176 | 056E | CD | 65 | 7D | | | | STRA,0 | AO,R1 |
| 177 | 0571 | 0C | 05 | 4D | | | | LODA,0 | DWG2 |
| 178 | 0574 | 44 | 0F | | | | | ANDI,0 | H'0F' |
| 179 | 0576 | CD | 25 | 7D | | | | STRA,0 | AO,R1,+ |
| 180 | 0579 | 1F | 04 | 56 | | | | BCTA,3 | TERM |
| 181 | 057C | | | | | | LAMP | RES | 1 |
| 182 | 057D | | | | | | AO | RES | H'0C' |
| 183 | | | | | | | * | | |
| 184 | | | | | | | * SUBR. OUTPUT | | |

-continued

| PIP ASSEMBLER | | | | | | | | |
|---|---|---|---|---|---|---|---|---|
| LINE | ADDR | B1 | B2 | B3 | B4 | ERR | SOURCE | |
| 185 | | | | | | | • | |
| 186 | | | | | | | • | |
| 187 | | | | | | | * TIME FILLER (TIFR) | |
| 188 | 0689 | 0C | 04 | 98 | | | OUTP  LODA,0 | SPD |
| 189 | 058C | A4 | 01 | | | | SUBI,0 | H'01' |
| 190 | 058E | 18 | 02 | | | | BCTR,0 | OUT |
| 191 | 0590 | 1B | 7A | | | | BCTR,3 | OUTP+3 |
| 192 | | | | | | | * OUTPUT | |
| 193 | 0592 | 0C | 05 | 4C | | | OUT  LODA,0 | DWG1 |
| 194 | 0595 | B0 | | | | | WRTC,0 | |
| 195 | 0596 | 0C | 05 | 4D | | | LODA,0 | DWG2 |
| 196 | 0599 | F0 | | | | | WRTD,0 | |
| 197 | 059A | 04 | 00 | | | | LODI,0 | H'00' |
| 198 | 059C | D4 | 00 | | | | WRTE,0 | H'00' |
| 199 | 059E | 37 | | | | | RETE,3 | |
| 200 | | | | | | | • | |
| 201 | | | | | | | * SUBR. CLEAR | |
| 202 | | | | | | | • | |
| 203 | | | | | | | • | |
| 204 | 059F | 04 | 00 | | | | CLR  LODI,0 | H'00' |
| 205 | 05A1 | CC | 05 | 7C | | | STRA,0 | LAMP |
| 206 | 05A4 | D4 | 01 | | | | WRTE,0 | H'01' |
| 207 | 05A6 | 1F | 04 | 56 | | | BCTA,3 | TERM |
| 208 | | | | | | | • | |
| 209 | | | | | | | * SUBR. START/MANUAL | |
| 210 | | | | | | | • | |
| 211 | | | | | | | • | |
| 212 | 05A9 | 04 | C0 | | | | STR  LODI,0 | H'00' |
| 213 | 05AB | CC | 06 | 7C | | | STRA,0 | WSSL |
| 214 | 05AE | CC | 06 | 7D | | | STRA,0 | WSSL+1 |
| 215 | 05B1 | CC | 06 | 7E | | | STRA,0 | WSSL+2 |
| 216 | 05B4 | 0D | 06 | E4 | | | LODA,1 | STAT |
| 217 | 05B7 | 25 | 01 | | | | EORI,1 | H'01' |
| 218 | 05B9 | D5 | 03 | | | | WRTE,1 | H'03' |
| 219 | 05BB | CD | 06 | E4 | | | STRA,1 | STAT |
| 220 | 05BE | 04 | 00 | | | | LODI,0 | H'00' |
| 221 | 05C0 | CC | 06 | E5 | | | STRA,0 | XREG |
| 222 | 05C3 | 04 | 01 | | | | LODI,0 | H'01' |
| 223 | 05C5 | CC | 06 | E6 | | | STRA,0 | LREG |
| 224 | 05C8 | 1F | 05 | E6 | | | BCTA,3 | ST1 |
| 225 | | | | | | | * INPUT MAN | |
| 226 | 05CB | 04 | 1F | | | | MAN  LODI,0 | H'1F' |
| 227 | 05CD | CC | 06 | 7C | | | STRA,0 | WSSL |
| 228 | 05D0 | 0C | 06 | E2 | | | LODA,0 | AD1 |
| 229 | 05D3 | CC | 06 | 7D | | | STRA,0 | WSSL+1 |
| 230 | 05D6 | 0C | 06 | E3 | | | LODA,0 | AD1+1 |
| 231 | 05D9 | CC | 06 | 7E | | | STRA,0 | WSSL+2 |
| 232 | 05DC | 0C | 06 | E4 | | | LODA,0 | STAT |
| 233 | 05DF | 24 | 02 | | | | EORI,0 | H'02' |
| 234 | 05E1 | D4 | 03 | | | | WRTE,0 | H'03' |
| 235 | 05E3 | CC | 06 | E4 | | | STRA,0 | STAT |
| 236 | | | | | | | * SWITCH ON LAMP A-F | |
| 237 | 05E6 | 0C | 06 | E6 | | | ST1  LODA,0 | LREG |
| 238 | 05E9 | D4 | 01 | | | | WRTE,0 | H'01' |
| 239 | | | | | | | * DIFF. BETWEEN 2 POINTS | |
| 240 | 05EB | 0C | 05 | 4C | | | LODA,0 | DWG1 |
| 241 | 05EE | 0D | 06 | E5 | | | LODA,1 | XREG |
| 242 | 05F1 | AD | 65 | 7D | | | SUBA,0 | A0,R1 |
| 243 | 05F4 | CC | 06 | E7 | | | STRA,0 | SDW1 |
| 244 | 05F7 | 77 | 08 | | | | PPSL | H'08' |
| 245 | 05F9 | 0C | 05 | 4D | | | LODA,0 | DWG2 |
| 246 | 05FC | 44 | 0F | | | | ANDI,0 | H'0F' |
| 247 | 05FE | AD | 25 | 7D | | | SUBA,0 | A0,R1+ |
| 248 | 0601 | CC | 06 | E8 | | | STRA,0 | SDW2 |
| 249 | 0604 | 75 | 08 | | | | CPSL | H'08' |
| 250 | | | | | | | * IS DIFF. ZERO | |
| 251 | 0606 | 0D | 06 | E7 | | | LODA,1 | SDW1 |
| 252 | 0609 | E5 | 00 | | | | COMI,1 | H'00' |
| 253 | 060B | 9C | 06 | 13 | | | BCFA,0 | CHGE |
| 254 | 060E | E4 | 00 | | | | COMI,0 | H'00' |
| 255 | 0610 | 1C | 06 | 5E | | | BCTA,0 | VOLG |
| 256 | | | | | | | * DIFF. +/− | |
| 257 | 0613 | 44 | 80 | | | | CHGE  ANDI,0 | H'80' |
| 258 | 0615 | 5C | 06 | 9C | | | BRNA,0 | PSMV |
| 259 | | | | | | | * NEG MOVE | |
| 260 | 0618 | 0C | 06 | E4 | | | NGMV  LODA,0 | STAT |
| 261 | 061B | 44 | 0F | | | | ANDI,0 | H'0F' |
| 262 | 061D | 24 | 20 | | | | EORI,0 | H'20' |
| 263 | 061F | D4 | 03 | | | | WRTE,0 | H'03' |
| 264 | 0621 | CC | 06 | E4 | | | STRA,0 | STAT |

-continued

PIP ASSEMBLER

| LINE | ADDR | B1 | B2 | B3 | B4 | ERR | SOURCE | | |
|------|------|----|----|----|----|-----|--------|---|---|
| 265 | 0624 | 0C | 06 | E7 | | | | LODA,0 | SDW1 |
| 266 | 0627 | A4 | 01 | | | | | SUBI,0 | H'01' |
| 267 | 0629 | CC | 06 | E7 | | | | STRA,0 | SDW1 |
| 268 | 062C | 13 | | | | | | SPSL | |
| 269 | 062D | 44 | 01 | | | | | ANDI,0 | H'01' |
| 270 | 062F | 24 | 01 | | | | | EORI,0 | H'01' |
| 271 | 0631 | C1 | | | | | | STRZ | 1 |
| 272 | 0632 | 0C | 06 | E8 | | | | LODA,0 | SDW2 |
| 273 | 0635 | A1 | | | | | | SUBZ | 1 |
| 274 | 0636 | CC | 06 | E8 | | | | STRA,0 | SDW2 |
| 275 | 0639 | 0D | 05 | 4C | | | | LODA,1 | DWG1 |
| 276 | 063C | A4 | 01 | | | | | SUBI,1 | H'01' |
| 277 | 063E | CD | 05 | 4C | | | | STRA,1 | DWG1 |
| 278 | 0641 | 13 | | | | | | SPSL | |
| 279 | 0642 | 44 | 01 | | | | | ANDI,0 | H'01' |
| 280 | 0644 | 24 | 01 | | | | | EORI,0 | H'01' |
| 281 | 0646 | C1 | | | | | | STRZ | 1 |
| 282 | 0647 | 0C | 05 | 4D | | | | LODA,0 | DWG2 |
| 283 | 064A | A1 | | | | | | SUBZ | 1 |
| 284 | 064B | CC | 05 | 4D | | | | STRA,0 | DWG2 |
| 285 | | | | | | | * IS DIFF. ZERO | | |
| 286 | 064E | 0C | 06 | E7 | | | DIFF | LODA,0 | SDW1 |
| 287 | 0651 | E4 | 00 | | | | | COMI,0 | H'00' |
| 288 | 0653 | 9C | 06 | D4 | | | | BCFA,0 | OUT |
| 289 | 0656 | 0C | 06 | E8 | | | | LODA,0 | SDW2 |
| 290 | 0659 | E4 | 00 | | | | | COMI,0 | H'00' |
| 291 | 065B | 9C | 06 | D4 | | | | BCFA,0 | OUT |
| 292 | | | | | | | * NEXT STEP | | |
| 293 | 065E | 0C | 06 | E6 | | | NEXT | LODA,0 | LREG |
| 294 | 0661 | D0 | | | | | | RRL,0 | |
| 295 | 0662 | CC | 06 | E6 | | | | STRA,0 | LREG |
| 296 | 0665 | 0C | 06 | E5 | | | | LODA,0 | XREG |
| 297 | 0668 | 84 | 02 | | | | | ADDI,0 | H'02' |
| 298 | 066A | CC | 06 | E5 | | | | STRA,0 | XREG |
| 299 | | | | | | | * INDEX 12 | | |
| 300 | 066D | E4 | 0C | | | | | COMI,0 | H'00' |
| 301 | 066F | 9C | 06 | 7C | | | | BCFA,0 | WSSL |
| 302 | 0672 | 05 | 00 | | | | | LODI,1 | H'00' |
| 303 | 0674 | CD | 06 | E5 | | | | STRA,1 | XREG |
| 304 | 0677 | 05 | 01 | | | | | LODI,1 | H'01' |
| 305 | 0679 | CD | 06 | E6 | | | | STRA,1 | LREG |
| 306 | 067C | | | | | | WSSL | RES | H'03' |
| 307 | 067F | 30 | | | | | | REDC,0 | |
| 308 | 0680 | 44 | 80 | | | | | ANDI,0 | H'80' |
| 309 | 0682 | 1E | 06 | 88 | | | | BCTA,2 | TIFR |
| 310 | 0685 | 1F | 04 | 56 | | | | BCTA,3 | TERM |
| 311 | 0688 | 04 | 7F | | | | TIFR | LODI,0 | H'7F' |
| 312 | 068A | CC | 06 | EA | | | | STRA,0 | CNTR+1 |
| 313 | 068D | 3F | 06 | E9 | | | | BSTA,3 | CNTR |
| 314 | 0690 | 1F | 05 | E6 | | | | BCTA,3 | ST1 |
| 315 | 0693 | 30 | | | | | MANL | REDC,0 | |
| 316 | 0694 | 44 | 40 | | | | | ANDI,0 | H'40' |
| 317 | 0696 | 9C | 06 | 93 | | | | BCFA,0 | MANL |
| 318 | 0699 | 1F | 04 | 56 | | | | BCTA,3 | TERM |
| 319 | 069C | 0C | 06 | E4 | | | PSMV | LODA,0 | STAT |
| 320 | 069F | 44 | 0F | | | | | ANDI,0 | H'0F' |
| 321 | 06A1 | 24 | 10 | | | | | EORI,0 | H'10' |
| 322 | 06A3 | D4 | 03 | | | | | WRTE,0 | H'03' |
| 323 | 06A5 | CC | 06 | E4 | | | | STRA,0 | STAT |
| 324 | 06A8 | 0C | 06 | E7 | | | | LODA,0 | SDW1 |
| 325 | 06AB | 84 | 01 | | | | | ADDI,0 | H'01' |
| 326 | 06AD | CC | 06 | E7 | | | | STRA,0 | SDW1 |
| 327 | 06B0 | 13 | | | | | | SPSL | |
| 328 | 06B1 | 44 | 01 | | | | | ANDI,0 | H'01' |
| 329 | 06B3 | C1 | | | | | | STRZ | 1 |
| 330 | 06B4 | 0C | 06 | E8 | | | | LODA,0 | SDW2 |
| 331 | 06B7 | 81 | | | | | | ADDZ | 1 |
| 332 | 06B8 | CC | 06 | E8 | | | | STRA,0 | SDW2 |
| 333 | 06BB | 0C | 05 | 4C | | | | LODA,0 | DWG1 |
| 334 | 06BE | 84 | 01 | | | | | ADDI,0 | H'01' |
| 335 | 06C0 | CC | 05 | 4C | | | | STRA,0 | DWG1 |
| 336 | 06C3 | 13 | | | | | | SPSL | |
| 337 | 06C4 | 44 | 01 | | | | | ANDI,0 | H'01' |
| 338 | 06C6 | 0D | 05 | 4D | | | | LODA,1 | DWG2 |
| 339 | 06C9 | 45 | 0F | | | | | ANDI,1 | H'0F' |
| 340 | 06CB | 81 | | | | | | ADDZ | 1 |
| 341 | 06CC | CC | 05 | 4D | | | | STRA,0 | DWG2 |
| 342 | 06CF | 75 | 01 | | | | | CPSL | H'01' |
| 343 | 06D1 | 1F | 06 | 4E | | | | BCTA,3 | DIFF |
| 344 | 06D4 | 3F | 05 | 89 | | | OUT | BSTA,3 | OUTP |

-continued

PIP ASSEMBLER
LINE ADDR B1 B2 B3 B4 ERR SOURCE

| LINE | ADDR | B1 | B2 | B3 | B4 | ERR | SOURCE | | |
|------|------|----|----|----|----|----|---------|---------|---------|
| 345  |      |    |    |    |    |    | *       |         |         |
| 346  | 06D7 | 0C | 06 | E4 |    |    |         | LODA,0  | STAT    |
| 347  | 06DA | 44 | 10 |    |    |    |         | ANDI,0  | H'10'   |
| 348  | 06DC | 1D | 06 | A8 |    |    |         | BCTA,1  | PSMV+H'0C' |
| 349  | 06DF | 1F | 06 | 24 |    |    |         | BCTA,3  | NGMV+H'0C' |
| 350  |      |    |    |    |    |    | *       |         |         |
| 351  | 0001 |    |    |    |    |    | R1      | EQU     | H'01'   |
| 351  | 0003 |    |    |    |    |    | R3      | EQU     | H'03'   |
| 353  | 06E2 | 06 | 93 |    |    |    | AD1     | ACON    | MANL    |
| 354  | 06E4 |    |    |    |    |    | STAT    | RES     | 1       |
| 355  | 06E5 |    |    |    |    |    | XREG    | RES     | 1       |
| 356  | 06E6 |    |    |    |    |    | LREG    | RES     | 1       |
| 357  | 06E7 |    |    |    |    |    | SDW1    | RES     | 1       |
| 358  | 06E8 |    |    |    |    |    | SDW2    | RES     | 1       |
| 359  |      |    |    |    |    |    | *       |         |         |
| 360  |      |    |    |    |    |    | * SUBR COUNTER |  |    |
| 361  |      |    |    |    |    |    | *       |         |         |
| 362  |      |    |    |    |    |    | *       |         |         |
| 363  | 06E9 | 05 | 3F |    |    |    | CNTR    | LODI,1  | H'3F'   |
| 364  | 06EB | 04 | FF |    |    |    | BUF1    | LODI,0  | H'FF'   |
| 365  | 06ED | A4 | 01 |    |    |    | CIN     | SUBI,0  | H'01'   |
| 366  | 06EF | 1C | 06 | F5 |    |    |         | BCTA,0  | BUF2    |
| 367  | 06F2 | 1F | 06 | ED |    |    |         | BCTA,3  | CIN     |
| 368  | 06F5 | A5 | 01 |    |    |    | BUF2    | SUBI,1  | H'01'   |
| 369  | 06F7 | 34 |    |    |    |    |         | RETE,0  |         |
| 370  | 06F8 | 1F | 06 | EB |    |    |         | BCTA,3  | BUF1    |
| 371  |      |    |    |    |    |    |         | END     |         |

TOTAL ASSEMBLER ERRORS = 0

FUNCTION DESCRIPTION OF THE BUTTONS OF THE PANEL.

Hereinafter, a description is given of the operation of the various buttons on the programming panel described with reference to the FIGS. 6–12.

The buttons A–F are pushbuttons which include a built-in indication lamp. They are used, in conjunction with the button SEQ, for assembling the user progravia the panel. A programming cycle is assembled as follows.

Using the button MV+ or MV−, the contents of the output register MPROUT in MPR are modified until the value transferred from this register to a digital-/analog converter DAC corresponds to the desired value, visible to the operator on a machine. Subsequently, the button SEQ is depressed. The lamp of this button lights up to signify that the routine SEQUENCE has started. Subsequently, button A is depressed, the lamp of which also lights up. The first information step of the user program is now stored in the memory. Subsequently, this cycle is repeated until all steps have been stored in the memory. If subsequently a block is to be changed, possibly during the execution of the user program, the indication lamps A to F are reset by means of the button CLR. By means of MV+ and MV−, the contents of the output register MPROUT in MPR are then changed to the desired new value. The routine SEQUENCE is then started again, after which the contents of the step to be modified are replaced by the new information by means of the associated button.

The buttons AC and V are used for storing a position of the thumb wheel switches in two positions in a program step. In this example, these two parameter values are the acceleration and the speed at which a distance described by the step must be completed. The application program can also assign a different meaning to these parameters, see the description of the system with reference to FIG. 3. As a result, this meaning may differ from one application to an other, so that the panel can be universally used.

The buttons MV+ and MV− enable the operator of the programming panel to change the value of the output signal from the micro-computer MPR to the machine to be controlled at random, the result of his action in being made visible at the same time the system to be controlled. During depression of these buttons, the built-in indication lamp lights up. If the button is held too long, so that the output signal exceeds the predetermined range, the indication lamp starts to flash. The only operation which is still possible in such circumstances is the depression of the button for the other direction, until the lamp thereof lights up. See also the above description of the buttons A–F.

When the button ST (START) is depressed, the application program starts to complete the programmed series of user program steps, starting with the block A, followed by the block B up to and including the block F. Subsequently, according to the set-up of this example, the entire sequence is repeated. The indication lamps in the buttons A to F indicate which block of the user program is being treated. At the same time, the lamps of MV+ and MV− indicate whether the output signal increases of decreases.

As long as the button ST(ART) is depressed, the user program is cyclically completed. When this button is switched off, the present step is completed and the user program is stopped. IF the button MN is depressed instead of the button START, in first instance exactly the same happens. The only difference consists in that the application program steps each time after completion of one step of the user program. Subsequently, there is a waiting period until the button MN is depressed again in order to execute the next step of the user program.

What is claimed is:

1. A programming panel device for generating and correcting user programs, said device connected to a computer having a memory for controlling a machine control system, said device comprising:
a processor;
said processor storage means including means to store at least one function step in a user program;
keyboard means for data entry into said processor;
input/output means for said processor;
display means under the control of said processor for displaying function steps of said user programs;
bus means for connection of said input/output means to said computer and said machine control system;
function selection means under the control of said processor for the selection of a function to be programmed comprising:
means to transfer a table of function codes and associated parameter codes for at least one function step of a user program from said computer over said bus means to said storage means of said processor;
said display means including means for displaying said function and parameter codes;
said transferred and displayed parameter codes being dependent upon the function selected by said function selection means;
parameter value input means under the control of said processor for inputting specific values for said parameters to be inserted into functions which have been selected, the inputting of a parameter value for all of the parameters in the function selected resulting in the completion of the programming of a selected function;
means to transfer said completed function to said processor storage means to be stored as a user program step;
means to transfer each of said completed user program steps to said memory of said computer over said bus means for storage in said computer and for subsequent execution by said computer for controlling said machine control system.

2. A device as claimed in claim 1, wherein a plurality of function selection means have a fixed designation relating to standard functions occurring in a specific field of machine control application.

3. A device as claimed in claim 1, wherein said processor is a microprocessor.

4. A device as claimed in claim 1 wherein said device is detachable from said bus connection.

5. A device as claimed in claim 1 wherein said parameter value input means further includes means to stepwise, continuously modify the value of a parameter associated with a function, and means to apply, under the control of said processor, the modified parameter value directly to the machine to be controlled for execution.

* * * * *